United States Patent [19]

Futamura

[11] Patent Number: 5,745,855
[45] Date of Patent: Apr. 28, 1998

[54] MOBILE RADIO COMMUNICATION SYSTEM PERMITTING A MOBILE STATION TO SPECIFY A BASE STATION USED BY THE SAME

[75] Inventor: Yoshisumi Futamura, Toyota, Japan

[73] Assignee: Toyota Jidosha Kabushiki Kaisha, Toyota, Japan

[21] Appl. No.: 519,728

[22] Filed: Aug. 28, 1995

[30] Foreign Application Priority Data

Aug. 26, 1994 [JP] Japan ................................ 6-202175
Aug. 8, 1995 [JP] Japan ................................ 7-202633

[51] Int. Cl.[6] ................................................ H04B 7/26
[52] U.S. Cl. .................. 455/517; 455/524; 340/825.08; 340/825.54
[58] Field of Search ........................... 455/53.1, 54.1, 455/52.1, 33.1–34.1, 67.1, 507, 517, 524, 525; 340/825.08, 825.54, 505; 342/50, 51

[56] References Cited

U.S. PATENT DOCUMENTS

| | | | |
|---|---|---|---|
| 5,058,201 | 10/1991 | Ishii et al. | 455/33.2 |
| 5,257,406 | 10/1993 | Ito | 455/33.1 |
| 5,329,576 | 7/1994 | Handforth | 455/33.1 |

FOREIGN PATENT DOCUMENTS

| | | |
|---|---|---|
| 63-209235 | 8/1988 | Japan . |
| 64-9508 | 1/1989 | Japan . |
| 3-34632 | 2/1991 | Japan . |
| 3-243026 | 10/1991 | Japan . |
| 5-168059 | 7/1993 | Japan . |
| 5-252089 | 9/1993 | Japan . |
| 6-237212 | 8/1994 | Japan . |

OTHER PUBLICATIONS

International Electrotechnical Commission (IEC) proposal of SC65C. Physical Layer Specification and Service Definition Radio Medium. Proposed clauses 18, 19 and 20 of DIS document 65C(C.O.)34. Mar. 26, 1993.

*Primary Examiner*—Chi H. Pham
*Attorney, Agent, or Firm*—Oblon, Spivak, McClelland, Maier & Neustadt, P.C.

[57] ABSTRACT

Through a technique such as a carrier sense system or the like, a mobile station (14) identifies a base station (12) (requested base station) by which the mobile station is to be controlled. In response to polling from a key station (10), the base station informs the key station (10) of the requested base station. When the key station (10) performs the polling to know that a receiving base station which obtained the response is different from the requested base station, the next polling will be made through both the base stations (12). If the key station receives the response from the requested base station, the key station switches the base station controlled by itself from one to another.

19 Claims, 29 Drawing Sheets

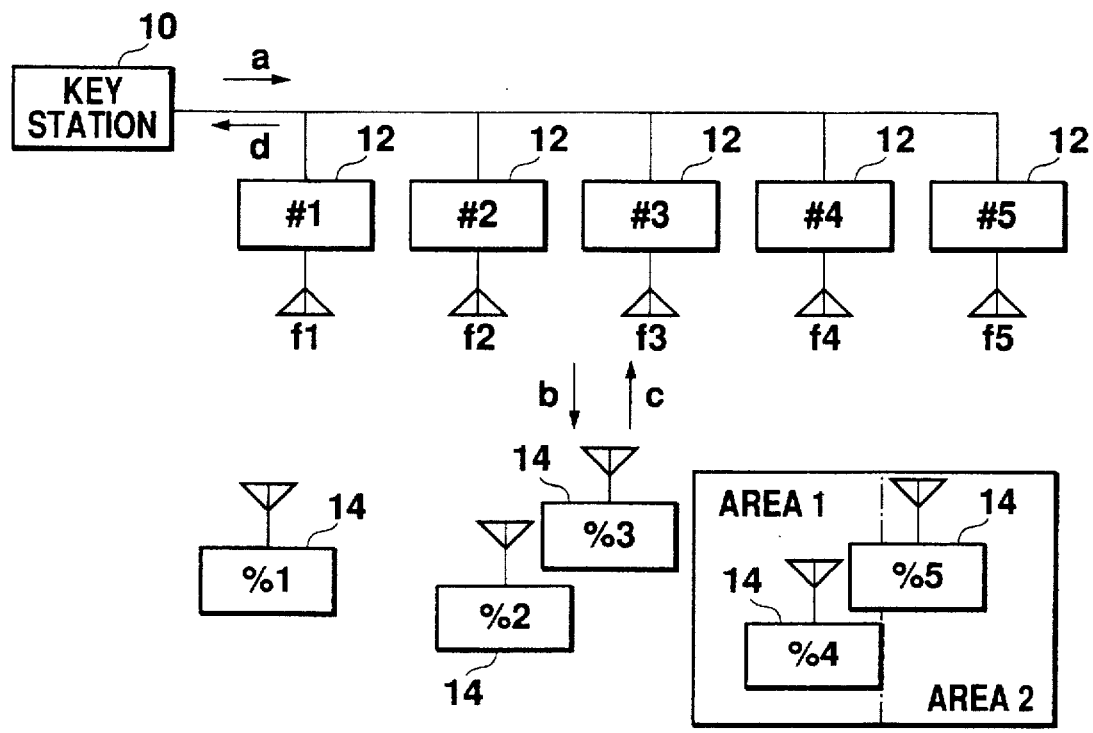
Fig. 1
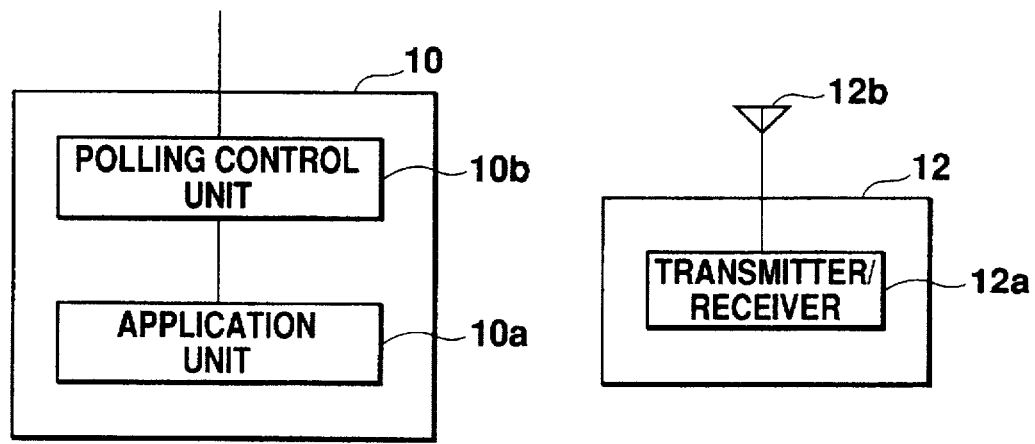
Fig. 2A
Fig. 2B

Fig. 4A

| FRAME START | SELECTED BASE STATION NUMBER | INDICATION CHANNEL NUMBER | MOBILE STATION NUMBER | UP/DOWN FLAG | DATA | FRAME END |

Fig. 4B

| FRAME START | INDICATION CHANNEL NUMBER | MOBILE STATION NUMBER | UP/DOWN FLAG | DATA | FRAME END |

Fig. 4C

| FRAME START | REQUESTED CHANNEL NUMBER | MOBILE STATION NUMBER | UP/DOWN FLAG | AREA NUMBER | DATA | FRAME END |

Fig. 4D

| FRAME START | RECEIVING BASE STATION NUMBER | REQUESTED CHANNEL NUMBER | MOBILE STATION NUMBER | UP/DOWN FLAG | AREA NUMBER | DATA | FRAME END |

| CHANNEL NO. | f1 | f2 | f3 | f4 | f5 |
|---|---|---|---|---|---|
| BASE STATION NO. | #1 | #2 | #3 | #4 | #5 |

CHANNEL SETTING TABLE

Fig. 5A

| AREA NO. | 1 | 2 |
|---|---|---|
| BASE STATION NO. | #3 | #4 |

AREA SETTING TABLE

| MOBILE STATION NO. | RECEIVING BASE STATION NO. | REQUESTED BASE STATION NO. |
|---|---|---|
| %1 | #1 | #1 |
| %2 | #2 | #2 |
| %3 | #2 | #2 |
| %4 | #3 | #3 |
| %5 | #4 | #4 |

BASE STATION REGISTRY TABLE

Fig. 6B

| RECEIVING BASE STATION NO. | #1 | | #2 | | #3 | | #4 | | #5 | |
|---|---|---|---|---|---|---|---|---|---|---|
| HEAD INDICATING/ PROCESSING FLAG | 0 | | 0 | | 1 | | 0 | | 0 | |
| | MOBILE STATION NO. | POLLING FLAG | MOBILE STATION NO. | POLLING FLAG | MOBILE STATION NO. | POLLING FLAG | MOBILE STATION NO. | POLLING FLAG | MOBILE STATION NO. | POLLING FLAG |
| | %1 | 1 | %2 | 0 | %4 | 1 | %5 | 1 | | |
| | | | %3 | 1 | | | | | | |

POLLING REGISTRY TABLE

Fig. 6C

| SELECTED BASE STATION NO. | #1 | #2 | #3 | #4 | #5 |
|---|---|---|---|---|---|
| MOBILE STATION NO. | %1 | %3 | %4 | %5 | NON |

POLLING INDICATION TABLE

| MOBILE STATION NO. | RECEIVING BASE STATION NO. | REQUESTED BASE STATION NO. | | | |
|---|---|---|---|---|---|
| %1 | #1 | #2 | #3 | #4 | #5 |
| %2 | #1 | #2 | #3 | #4 | #5 |
| %3 | #1 | #2 | #3 | #4 | #5 |
| %4 | #1 | #2 | #3 | #4 | #5 |
| %5 | #1 | #2 | #3 | #4 | #5 |

BASE STATION REGISTRY TABLE ON SETUP

S71: FOR MOBILE STATION COLUMN IN BASE STATION REGISTRY TABLE, USE RECEIVING AND REQUESTED BASE STATIONS TO REGISTER ALL BASE STATIONS USED IN SYSTEM

CHANNEL SETTING TABLE

| CHANNEL NO. | | f1 | f6 | f2 | f3 | f4 | f5 |
|---|---|---|---|---|---|---|---|
| BASE STATION NO. | PARENT NO. | #1 | #1 | #2 | #3 | #4 | #5 |
| | CHILD NO. | -1 | -2 | | | | |

Fig. 17A

AREA SETTING TABLE

| AREA NO. | | 1 | 2 |
|---|---|---|---|
| BASE STATION NO. | PARENT NO. | #3 | #4 |
| | CHILD NO. | | |

Fig. 17B

BASE STATION REGISTRY TABLE

| MOBILE STATION NO. | RECEIVING BASE STATION NO. | REQUESTED BASE STATION NO. | | | |
|---|---|---|---|---|---|
| %1 | #1-1 | #1-1 | | | |
| %2 | #2 | #2 | | | |
| %3 | #2 | #2 | | | |
| %4 | #3 | #3 | | | |
| %5 | #4 | #4 | | | |
| %6 | #1-2 | #1-2 | | | |

Fig. 18A

POLLING REGISTRY TABLE

| RECEIVING BASE (PARENT STATION NO.) | #1 | | #2 | | #3 | | #4 | | #5 | |
|---|---|---|---|---|---|---|---|---|---|---|
| HEAD INDICATING/ PROCESSING FLAG | 0 | | 0 | | 1 | | 0 | | 0 | |
| | MOBILE STATION NO. | POLLING FLAG | MOBILE STATION NO. | POLLING FLAG | MOBILE STATION NO. | POLLING FLAG | MOBILE STATION NO. | POLLING FLAG | MOBILE STATION NO. | POLLING FLAG |
| | %1 | 1 | %2 | 0 | %4 | 1 | %5 | 1 | %0 | 1 |
| | %6 | 0 | %3 | 1 | | | | | | |

%0: NO MOBILE STATION WHEREIN POLLING FLAG IS "1" AT ALL TIMES

Fig. 18B

POLLING INDICATION TABLE

| SELECTED (PARENT BASE STATION NO.) | #1 | #2 | #3 | #4 | #5 |
|---|---|---|---|---|---|
| MOBILE STATION NO. | %1 | %3 | %4 | %5 | %0 |

| FRAME START | SELECTED BASE STATION NUMBER | MOBILE STATION NUMBER | UP/DOWN FLAG | DATA | FRAME END |

Fig. 25B

| FRAME START | SELECTED BASE STATION NUMBER | MOBILE STATION NUMBER | UP/DOWN FLAG | DATA | FRAME END |

Fig. 25C

| FRAME START | SENDING BASE STATION NUMBER | REQUESTED BASE STATION NUMBER | MOBILE STATION NUMBER | UP/DOWN FLAG | AREA NUMBER | DATA | FRAME END |

Fig. 25D

| FRAME START | REQUESTED BASE STATION NUMBER | MOBILE STATION NUMBER | UP/DOWN FLAG | AREA NUMBER | DATA | FRAME END |

BASE STATION REGISTRY TABLE

| MOBILE STATION NO. | REQUESTED BASE STATION NO. |
|---|---|
| %1 | #1 |
| %2 | #2 |
| %3 | #2 |
| %4 | #3 |
| %5 | #4 |

Fig. 26A

POLLING REGISTRY TABLE

| REQUESTED BASE STATION NO. | #1 | | #2 | | #3 | | #4 | | #5 | |
|---|---|---|---|---|---|---|---|---|---|---|
| HEAD INDICATING/ PROCESSING FLAG | 0 | | 0 | | 1 | | 0 | | 0 | |
| | MOBILE STATION NO. | POLLING FLAG | MOBILE STATION NO. | POLLING FLAG | MOBILE STATION NO. | POLLING FLAG | MOBILE STATION NO. | POLLING FLAG | MOBILE STATION NO. | POLLING FLAG |
| | %1 | 1 | %2 | 1 | %4 | 1 | %5 | 1 | %0 | 1 |
| | | | %3 | 0 | | | | | | |

Fig. 26B

POLLING INDICATION TABLE

| SELECTED BASE STATION NO. | #3 |
|---|---|
| MOBILE STATION NO. | %4 |

Fig. 26C

| MOBILE STATION NO. | REQUESTED BASE STATION NO. | | | | |
|---|---|---|---|---|---|
| %1 | #1 | #2 | #3 | #4 | #5 |
| %2 | #2 | #2 | #3 | #4 | #5 |
| %3 | #2 | #2 | #3 | #4 | #5 |
| %4 | #3 | #2 | #3 | #4 | #5 |
| %5 | #4 | #2 | #3 | #4 | #5 |

BASE STATION REGISTRY TABLE
ON SETUP

MOBILE RADIO COMMUNICATION SYSTEM PERMITTING A MOBILE STATION TO SPECIFY A BASE STATION USED BY THE SAME

BACKGROUND OF THE INVENTION

1. Field of the Invention

The present invention relates to a mobile radio communication system wherein a single key station performs communication to and from a plurality of mobile stations through a plurality of base stations in a polled manner.

2. Description of the Related Art

In recent years, mechanized and unmanned operations have become increasingly widespread in various fields. Particularly, many operations in factories have been automated. With requirements in such factory automation, unmanned vehicle systems which automatically cause unmanned vehicles to carry loads or to perform other roles have been developed. Such unmanned vehicle systems include a key station for controlling a plurality of unmanned vehicles. Mobile radio communication is carried out between the key station and the unmanned vehicles to control them.

One of various types of such mobile radio communication is a system based on IEC (International Electrotechnical Commission) proposal of SC65C. In the IEC system, a single key station is connected by wire to a plurality of base stations which in turn perform wireless communication to and from a plurality of mobile stations in a polled manner (wherein each of the mobile stations carries out a transmission at a timing indicated by the key station). In such a system, further, one base station is previously assigned to the corresponding mobile stations. Therefore, the response time can be shortened by causing all the base stations to carry out parallel polling operations.

However, the prior art raises a problem in that the movable range of the mobile stations is limited because each of the base stations is previously assigned to the mobile stations to be controlled by that base station. More particularly, if the base stations are located far apart from each other, the entire system can have an increased range capable of controlling the mobile stations. If each of the base stations is fixed to the mobile stations to be controlled by that base station, however, no communication can be performed between the base station and a mobile station when the latter moves to a position too far away from that base station. To widen the freedom in the system, it is preferable that each of the base stations is not previously assigned to the mobile stations to be controlled by that base station. In such a case, however, another problem is raised in that a mobile station which moves to a new position must be smoothly assigned to one of the other base stations.

SUMMARY OF THE INVENTION

An object of the present invention is to provide a mobile radio communication system which can smoothly switch the base stations from one to another.

According to the present invention, a mobile station transmits the identification signal of a base station which should be used next by that mobile station. Therefore, the key station can always grasp the base stations to be used by that key station in the polling of the base stations. The key station can maintain good communication in spite of the movement of the mobile stations over a wide area (switchover of the base stations).

The polling continues via two base stations, a base station identified by a mobile station as the base station which will next be used and a base station which received the previous polling response from the mobile station, until the two base stations coincide with each other.

On switchover, therefore, the communication can be reliably made to improve the reliability in the communication.

A mobile station is responsive to the identification signal of a base station indicated by the key station to switch the present base station to another responsible base station. Therefore, the switchover between the base stations can be reliably carried out to improve the reliability of the communication.

A base station to be used by a mobile station has been previously selected depending on an area in which that mobile station will be present. Thus, the base station can be reliably determined depending on the position of the mobile station.

The present invention utilizes a carrier sense system which is adapted to determine a base station to be used depending on the intensity of radio waves from a plurality of base stations, and also an area identification system which is adapted to determine a base station to be used by a mobile station depending on the position of that mobile station. If it is preferable, the area identification system will be utilized.

In one embodiment of the present invention, a plurality of base stations transmit the same signal to a plurality of mobile stations.

For example, the base stations transmit the same signal specifying a destination mobile station to all the mobile stations, each of which in turn receives this same signal irrespective of whether or not it is the destination mobile station. Only the destination mobile station returns the polling response to the base stations.

In such a manner, all the mobile stations can receive the signal for one mobile station. Therefore, security information or the like can be broadcast to all the mobile stations. Thus, all the mobile stations may be stopped at the same time.

In another embodiment of the present invention, the signals transmitted by all the base stations are of the same frequency. At any one time, one communication may be carried out between the key station and one mobile station through one base station.

In such a case, the key station has a table of the mobile stations to be communicated with. Depending on this table, the key station sequentially performs communication relative to all the mobile stations through the respective base stations.

Thus, a single frequency may be used to perform communication between the key station and the base stations. The frequency band used in this communication can be narrowed.

When there is no mobile station in an area covered by a base station, that base station will transmit a signal that does not specify any destination mobile station. Thus, the mobile station can positively recognize that it has entered an area controlled by any other base station. As a result, the base stations to be controlled can be reliably switched from one to another.

Furthermore, each of the mobile stations has a carrier sense function for sensing and comparing the levels of signals from the base stations such that that mobile station can recognize a base station having the highest signal level as a base station to be communicated with. Regardless of whether the same frequency is used by all the mobile stations in the communication, each of the mobile stations can select the optimum base station.

BRIEF DESCRIPTION OF THE DRAWINGS

FIG. 1 is a block diagram showing the entire layout of a system which is a first embodiment of the present invention.

FIG. 2A is a block diagram of the key station.

FIG. 2B is a block diagram of one base station.

FIG. 4A is a view showing the structure of a signal transmitted from the key station to the base stations.

FIG. 4B is a view showing the structure of a signal transmitted from one base station to the mobile stations.

FIG. 4C is a view showing the structure of a signal transmitted from one mobile station to the base stations.

FIG. 4D is a view showing the structure of a signal transmitted from one base station to the key station.

FIG. 5A is a view of a setting table illustrating the setting of channels.

FIG. 5B is a view of a setting table illustrating the setting of areas.

FIG. 6A is a view illustrating the registry of base stations.

FIG. 6B is a view illustrating the registry of polling.

FIG. 6C is a view illustrating the designation of polling.

FIG. 17A is a view of a setting table showing the setting of channels.

FIG. 17B is a view of a setting table showing the setting of areas.

FIG. 18A is a view illustrating the registry of base stations.

FIG. 18B is a view illustrating the registry of polling.

FIG. 18C is a view illustrating the designation of polling.

FIG. 25A is a view showing the structure of a signal transmitted from the key station to the base stations.

FIG. 25B is a view showing the structure of a signal transmitted from one base station to the mobile stations.

FIG. 25C is a view showing the structure of a signal transmitted from one mobile station to the base stations.

FIG. 25D is a view showing the structure of a signal transmitted from one base station to the key station.

FIG. 26A is a view illustrating the registry of base stations.

FIG. 26B is a view illustrating the registry of polling.

FIG. 26C is a view illustrating the designation of polling.

DETAILED DESCRIPTION OF THE PREFERRED EMBODIMENTS

First Embodiment

[System Layout]

Figure 2C:
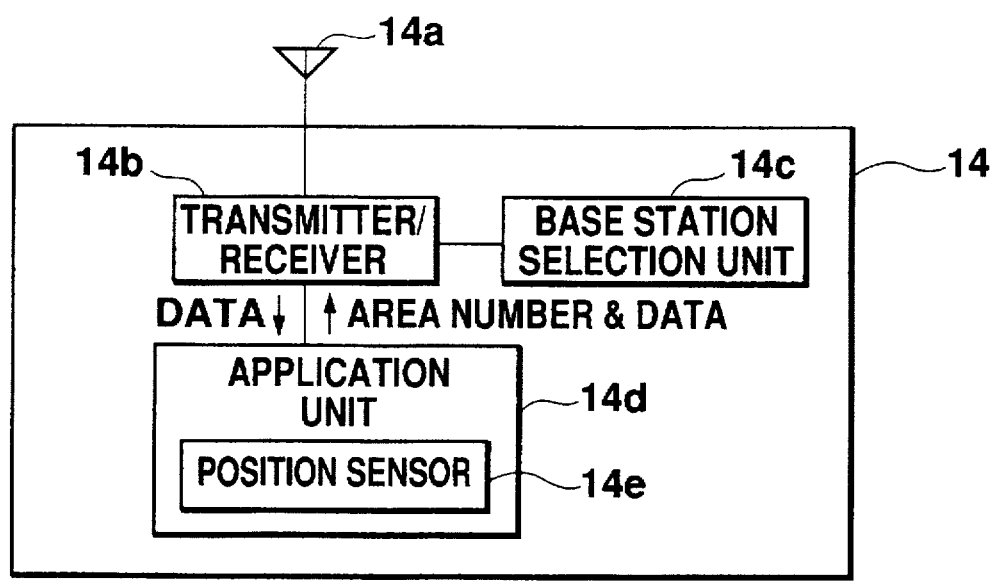
FIG. 2C is a block diagram of one mobile station.

FIGS. 1, 2A, 2B and 2C are block diagrams showing the structures of a key station, base station and mobile station respectively. As shown in FIG. 1, the key station 10 is connected to a plurality of base stations 12 (in this diagram, five base stations #1-#5 are shown) through communication lines. The system further comprises a plurality of mobile stations 14 (in this diagram, five mobile stations %1-%5 are shown), each of which is adapted to perform radio communication between that mobile station and any one of the base stations 12.

As shown in FIG. 2A, the key station 10 comprises an application unit 10b and a polling control unit 10b. When a program is executed in the application unit 10a, the latter transmits given data to all the base stations 12 through the polling control unit 10b. Data received by the polling control unit 10b is decoded by the application unit 10a. As shown in FIG. 2B, each of the base stations 12 includes a transmitter-receiver unit 12a and an antenna 12b. Data from the key station 10 is transmitted from the antenna 12b through the transmitter-receiver unit 12a while data received by the antenna 12b is transmitted to the key station 10 through the transmitter-receiver unit 12a. In this embodiment, one channel of a given frequency is allotted to each of the base stations 12. The frequencies of the base stations #1-#5 are f1-f5, respectively.

On the other hand, each of the mobile stations 14 includes an antenna 14a, a transmitter-receiver unit 14b, a base station selection unit 14c and an application unit 14d, as shown in FIG. 2C. A signal received by the antenna 14a is fed to the application unit 14d through the transmitter-receiver unit 14b. The signal is then decoded by the application unit 14d. The application unit 14d includes a position sensor 14e. Data obtained by the position sensor 14e (e.g., an area number wherein a mobile station is present, this number showing the position of that mobile station) is transmitted from the antenna 14a through the transmitter-receiver unit 14b to the base stations 12. The base station selection unit 14c is adapted to select any one of the base stations 12 which should communicate with the corresponding mobile station 14.

Figure 3:
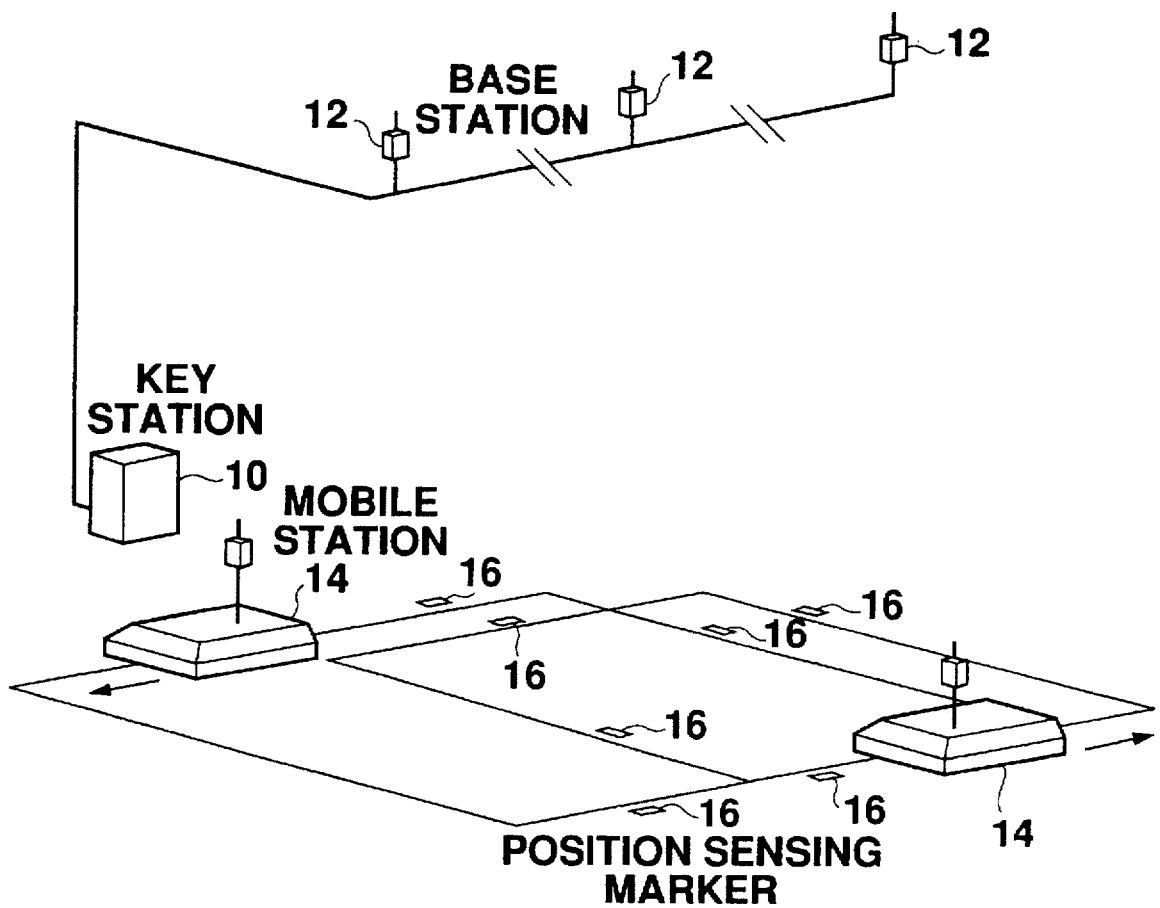
FIG. 3 is a diagrammatic view showing the appearance of the system.

FIG. 3 diagrammatically shows the appearance of the entire system wherein the key station 10 is connected to the base stations 12 through a cable. The mobile stations 14 are adapted to move on given paths, each of which includes position sensing markers 16 arranged at predetermined intervals. Each of the mobile stations 12 uses its position sensor 14e to sense one of the position sensing markers 16 so that the mobile station 12 can detect its own position (area number).

It is preferable that each of the position sensing markers 16 is only disposed at a location which is relatively close to a plurality of base stations 12 and in which it is difficult to judge which base station should be selected from the intensity of radio waves received by the base stations 12.

In such an arrangement, the key station 10 transmits various types of data to the respective mobile stations to perform various controls thereof, such as movement, stoppage and others. On the other hand, each of the mobile stations 14 provides data relating to its own movement and position (e.g., area number) to the key station 10. Thus, the mobile stations 14 can be moved under the predetermined control.

[Signal Frame Structure]

It is now assumed that a signal transmitted from the key station 10 to each of the base stations 12 is a; a signal from each of the base stations 12 to the corresponding one of the mobile stations is b; a signal from each of the mobile stations to the corresponding one of the base stations is c; and a signal from each of the base stations 12 to the key station 10 is d. The frame structures of these signals a–d are shown in FIGS. 4A, 4B, 4C and 4D, respectively.

The signal a consists of a frame start, a selected base station number, an indicated channel number, a mobile station number, an up/down flag, data and a frame end. The frame start is data indicating the start of the signal; the selected base station number is data specifying which base station this signal a should be transmitted from; the indicated channel number is data specifying a channel which is used by a base station (e.g., frequency band used or the like); the mobile station number is data specifying a mobile station to be transmitted to; the up/down flag is data indicating whether this signal is one transmitted from the key station or to be received by the key station; the data includes various data indicative of movement parameters and others; and the frame end shows the end of this signal a.

The signal b is different from the signal a only in that the data of the selected base station number is deleted. This is because the signal b is transmitted from the base station which has been specified by the signal a. The data of the selected base station number already specified is not required. The signal c consists of a frame start, a requested channel number, a mobile station number, an up/down flag, an area number, data and a frame end. The frame start of the signal c is data showing the start of this signal as in the down-side signal; the requested channel number is data indicating which channel a mobile station wishes to use; the mobile station number is data specifying the number of a mobile station from which this signal is transmitted to the corresponding base station; the up/down flag is data indicating whether this signal is up or down, as described; the area number is data indicating the position of the mobile station; the data includes various data relating to the state of the running mobile station and others; and the frame end is data indicating the end of the signal c. The signal d is similar to the signal c except for an additional receiving base station number. Thus, the key station 10 can receive the signal d to specify various data and a base station from which these data have been transmitted.

[Setting Table]

As shown in FIGS. 5A and 5B, the key station 10 has a setting table that has previously been set. This setting table is subject to the following conditions:

(1) The base station number is unique for each base station. In other words, only a single base station number is assigned to one base station. As an exception, the base stations in the same channel may have the same base station number. In such a case, however, the base stations of the same number will be subjected to broadcast polling in the same channel.

(2) A plurality of base station numbers may be used in the same channel (which is normally the same frequency band). This is because even if base stations which located physically remote from each other by a distance larger than the necessary one utilize the same channel signal in the communication, there will be no interference.

(3) One base station number must correspond to one area number. This is because the area number will not be controlled by two or more base stations at the same position since it is the data specifying the position of a mobile station.

(4) One base station number may be used by a plurality of area numbers. This is because it is assumed herein that one base station controls a predetermined area and a plurality of area numbers may be present in the controlled area to specify the position of that mobile station.

Under such conditions, the key station 10 has stored a table of base station numbers corresponding to the channel numbers as shown in FIG. 5A and data relating to two base stations that correspond to the area numbers as shown in FIG. 5B.

[Control Table]

To control the sequence of polling, the key station 10 has a table of base station registry, a table of polling registry and a table of polling indication, as shown in FIGS. 6A, 6B and 6C respectively. The base station registry table is adapted to store receiving base station numbers corresponding to all the mobile stations 14 controlled by the key station 10 as well as requested base station numbers. Each of the requested base station numbers is data relating to a base station which is optimum for the corresponding mobile station to perform communication therebetween. The polling registry table is adapted to store a polling flag relating to each of the receiving base stations registered in the base station registry table, the polling flag being used to determine the number of that mobile station and whether or not the polling should be made to the mobile station. The polling registry table also has stored a head indicating/processing flag that is used to determine which receiving base station the process should be initiated at. The polling indication table has stored the correspondence of a selected base station number actually subjected to the polling with a mobile station number, based on the sequence of polling in the polling registry table as well as the requested base station numbers.

[Process in Key Station]

The key station 10 utilizes the aforementioned setting and control tables to control the polling communication from or to the mobile stations through the base stations.

Figure 7:
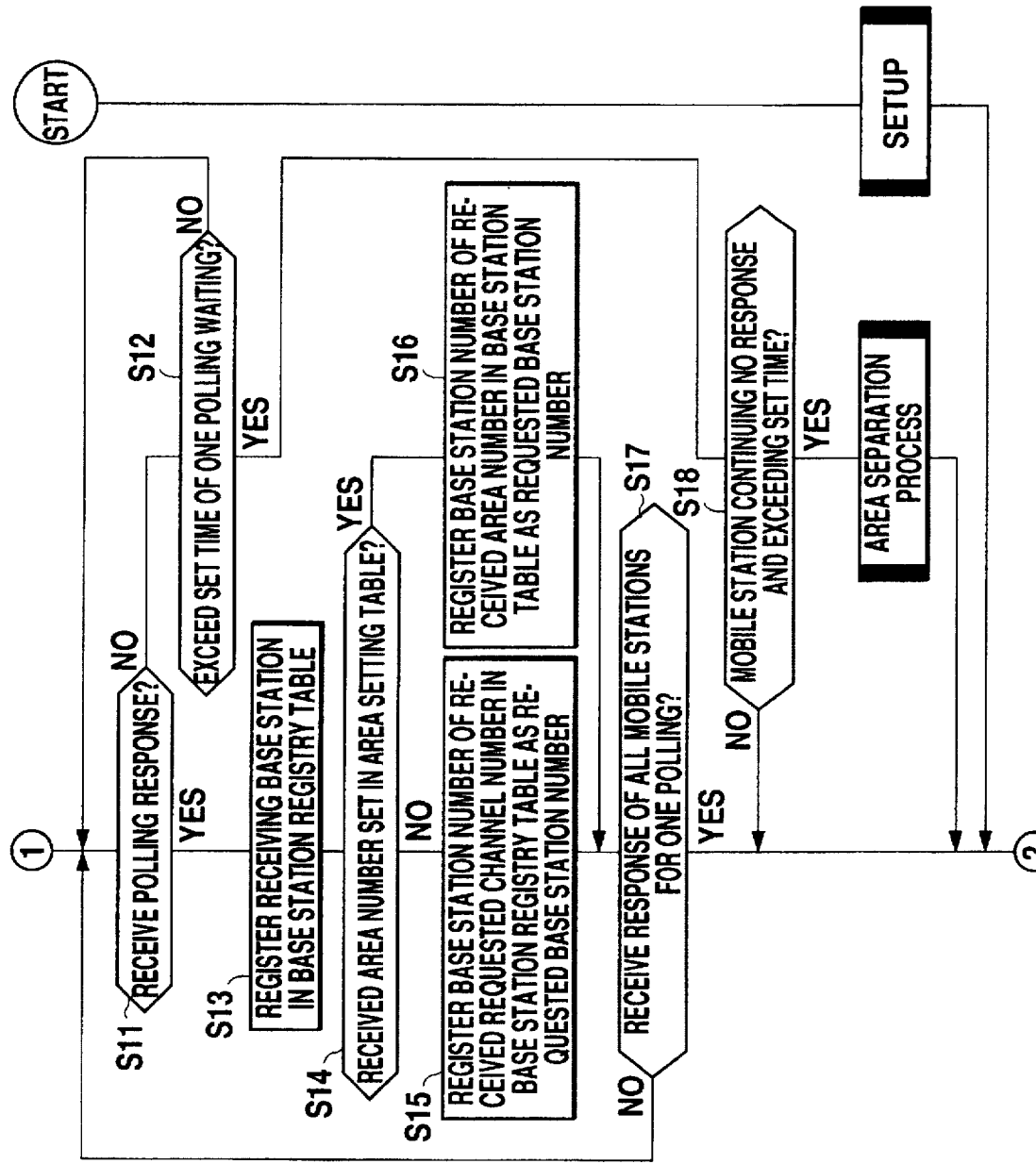
FIGS. 7-10 are flowcharts illustrating the processing in the key station.

FIG. 7 shows a procedure wherein after the polling has been made to one mobile station for one base station, a base station received the polling response is determined. It is then judged whether the base station used in the polling is being switched depending on the carrier sense or the position of the mobile station. Thereafter, a requested base station to be used in the next polling is determined.

After the polling has been made to one mobile station for one base station, it is first judged whether or not that base station receives the polling response (S11). If the polling response is not received by the base station, it is then judged whether or not one predetermined polling waiting time is exceeded (S12). If not, the procedure returns to the step S11 and it will be repeated. If the polling response is received by the base station at the step S11, the base station registry table stores its receiving base station number. In other words, a base station used by the mobile station that has received the polling response is registered in the base station registry table as a receiving base station (S13).

It is then judged whether or not a received area number has been set in the area setting table (S14). This is because the system uses a system (of area identification) in which if an area number has been set in the area setting table of FIG. 5B, a mobile station transmits an area number to inform the key station 10 of the position of that mobile station, the key station then determining a base station to control the mobile station (requested base station). If a received area number has not been set in the area setting table at the step S14, it means that a base station requested by a mobile station to be controlled (requested base station) determines the mobile station according to the carrier sense system. Thus, the base station number of the received and requested channel number is registered in the base station registry table as a requested base station number (S15). Depending on the result of the carrier sense, the mobile station transmits the maximum level carrier from the base station as a requested channel number which is in turn registered as a base station number. If a mobile station is in an area controlled by one base station, the receiving base station number becomes equal to the requested base station number. When a mobile station moves from an area controlled by one base station to another area controlled by the other base station, the receiving base station number becomes different from the requested base station number.

If an area number received at the step S14 has been set in the area setting area, the key station registers the base station number of the received area number in the base station registry table as a requested base station number (S16). This is carried out according to the area setting table of FIG. 5B to register a base station corresponding to the position of the mobile station as a requested base station number. When a mobile station moves from an area controlled by one base station to another area controlled by the other base station, therefore, the receiving base station number will be different from the requested base station number.

At the steps S15 and S16, one mobile station has been registered in the base station registry table. It is then judged whether or not the responses from all the mobile stations during one polling cycle are received (S17). If not, the procedure returns to the step S11 wherein the same process is repeated for the other mobile stations. All the base stations are registered in the base station registry table during one polling cycle. The one polling cycle is carried out according to the polling indication table of FIG. 6C. Thus, the polling is carried out to the respective one of the mobile stations for the selected base station. The number of mobile stations subjected to one polling cycle becomes equal to the number of selected base stations.

If one polling waiting/setting period is exceeded at the step S12, it is then judged whether or not there is a mobile station in which there is still no response and the setting time elapsed (S18). This is because when some pollings are tried and if there is no polling response, it is believed that this mobile station has moved out of the communicatable area.

In this case, an area separation process which will be described, must be performed.

Figure 8:
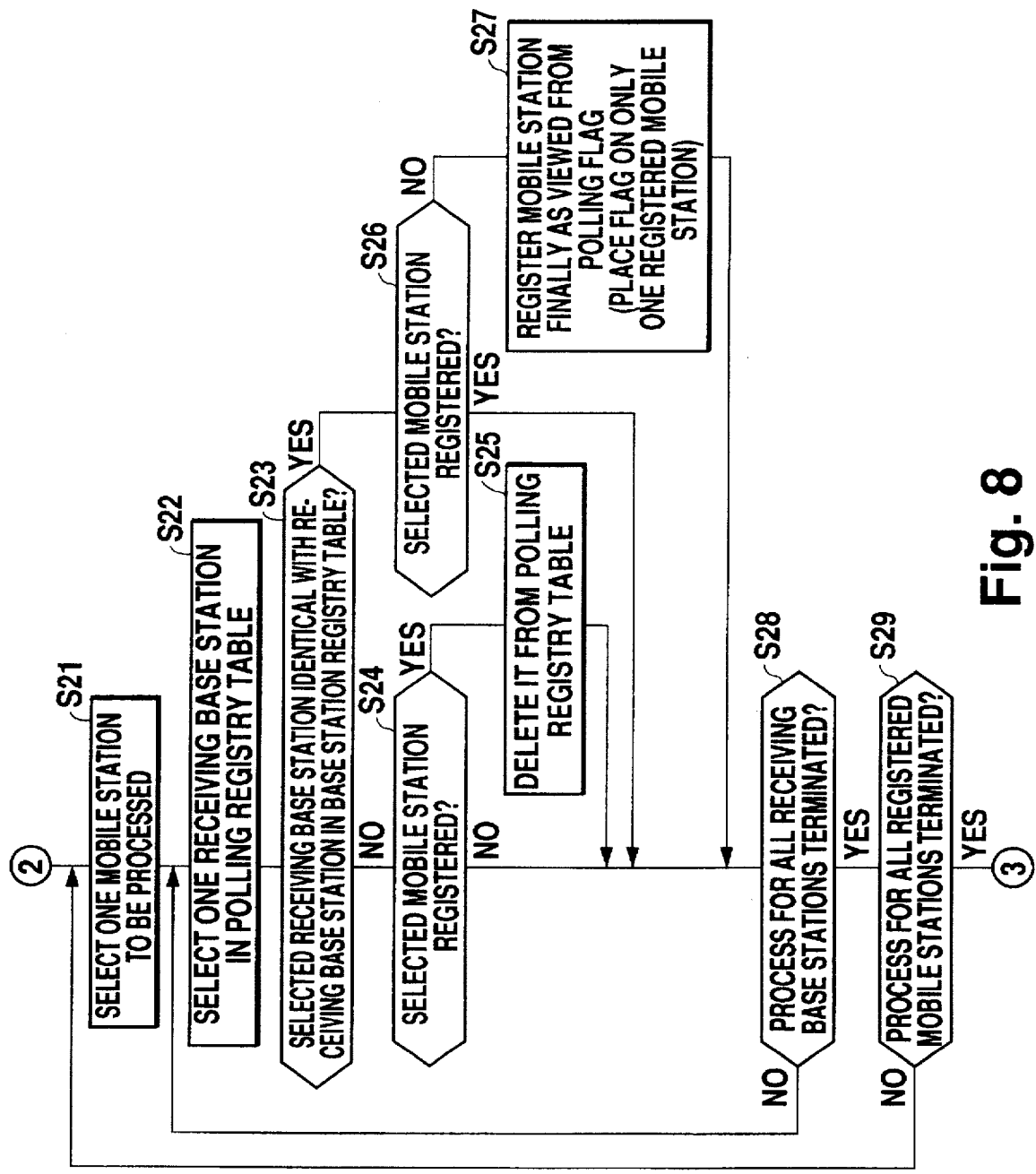

When the registration of the requested base station number into the base station registry table is terminated according to the process of FIG. 7, another process of updating the base station used in the polling to a base station now received is carried out, as shown in FIG. 8. The process of FIG. 8 is carried out even after the area separation process and the system setup process have been carried out.

The process of FIG. 8 is performed for all the registered mobile stations and for all the receiving base stations. One mobile station is first processed (S21). One receiving base station in the polling registry table is then processed (S22). It is then judged whether or not the receiving base station to be processed coincides with one in the base station registry table (S23). If the receiving base station number in the base station registry table is different from the requested base station number, this process performs the polling to the mobile stations through both the base stations. If there is a polling response from the requested base station, the base station to be controlled is changed.

If the result is NO at step 23, it means that the receiving base station has not controlled the mobile station to be processed until now. It is then judged whether or not the mobile station to be processed is registered in the receiving base station (S24). If the mobile station to be processed is registered, it is deleted from the polling registry table (S25). This is because the base station to be processed is not the receiving base station. When the mobile station to be processed moves from one base station to another base station, and if the other base station becomes a receiving base station, the base station previously used is deleted from the polling registry table. Since the receiving base station described in the base station registry table is updated at step S13, the base station actually used by the mobile station is registered in the base station registry table when the switchover of the base stations is terminated.

If the response is YES at step S23, it is judged whether or not the mobile station to be process has been registered (S26). If YES in both steps S23 and S26, no specific process will be carried out since the polling has been properly performed. On the other hand, if the result is NO at step S26, that mobile station must be registered as a mobile station for the receiving base station to be processed. For this purpose, this mobile station is registered in the polling registry table. However, the mobile station must be registered finally as viewed from the polling flag. This is because it is not intended to disturb the sequence of polling in the base station. If the mobile station is registered at a nearer location as viewed from the polling flag, the next polling will also be carried out relative to that mobile station. This will disturb the sequence of polling.

When the process at steps S25 and S27 has terminated and if the result is YES at step S26, it is then judged whether or not the procedure for all the receiving base stations has terminated (S28). If NO, the procedure returns to S22 wherein the process is repeated until the procedure relating to the mobile station to be processed for all the receiving base stations is completed. If YES at step S28, it is judged whether or not the procedure for all the registered mobile stations has terminated (S29). If not, the procedure returns to S21. In such a manner, all the receiving base stations for one mobile station are judged. Such a judgment is carried out for all the mobile stations. Thus, the polling registry table will be rearranged and updated for all the mobile stations.

If the process of FIG. 8 has terminated, the process is performed only when the receiving base station is different from the requested base station. This will be described with reference to FIG. 9. First of all, one base station to be processed is selected starting from a receiving base station on which a head indicating/processing flag stands (S31). With this receiving base station, a mobile station to be processed on which a polling flag stands is then selected (S32). With this mobile station to be processed, receiving and requested base station numbers are taken out from the base station registry table (S33).

There is also a case when a plurality of requested base station numbers are used if a plurality of base stations are allocated to the same channel. Even if there is only one requested base station number that coincides with a receiving base station number, only the receiving base station number is fetched. In other words, a base station to be subjected to actual communication is selected to.

It is then judged whether or not a mobile station corresponding to each of the fetched base station numbers is unregistered in the polling indication table (S34). In other words, the present polling is not carried out if polling can not be performed for all the base stations requested by one mobile station. If YES at step S34, the mobile station is registered at the location of each of the fetched base station numbers (S35). In such a manner, all the mobile stations are registered in the polling schedule of the base station requested by the mobile stations. If the receiving base station number for one mobile station is different from the requested base station number, that mobile station will be registered in the polling registry table both with the previous receiving base station number and the present requested base station number.

The polling flag of the polling registry table proceeds to the next one (S36). Thus, an object for the next polling is set. It is then judged whether or not the procedure for all the base stations has terminated (S37). If not, the procedure returns to S31 and is repeated. Thus, a mobile station on which a polling flag stands can be registered for all the base stations while a mobile station for a base station having its requested base station number can be registered. If YES at the step S37, the head indicating/processing flag proceeds to the next one (S38). This is because when polling is repeated many times for one mobile station due to communication error, it is intended to prevent the polling cycle for the other mobile stations from being prolonged by changing the first receiving base station to be processed for each polling operation such that the search sequence for this mobile station will be changed for each polling operation.

Figure 9:
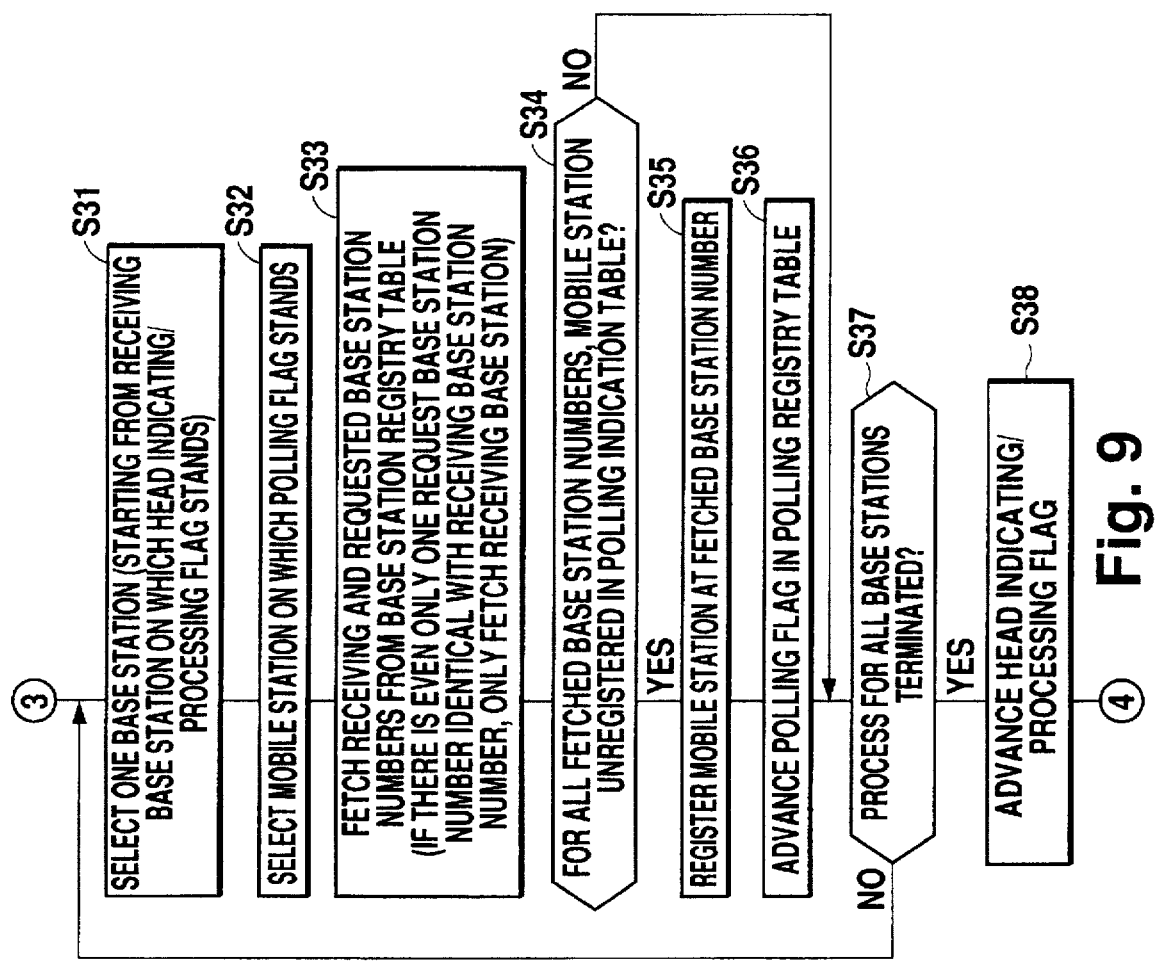

When the process of FIG. 9 has terminated, an indication channel number used in the polling communication is set. This setting will be described with reference to FIG. 10. First of all, a mobile station for one selected base station in the polling indication table is selected as an object to be processed (S41). It is then judged whether that mobile station is in the middle of setup or area separation (S42). If not, the indication channel number is judged to be the channel number of the requested base station (S43). If the mobile station is in the middle of setup or area separation, the indication channel number is judged to be the channel number of the selected base station (S44). This channel number setting is carried out according to the channel setting table. It is then judged whether or not the procedure for all the selected base stations has completed (S45). If not, the procedure returns to S41 and is repeated.

Thus, the channel number indicated to the mobile station becomes a channel number now requested, independent of the base station used. During the setup or area separation, the indicated channel number becomes the channel number of a mobile station used in the polling, in consideration of a case where the mobile station itself did not judge that it was undergoing area separation.

Once the system is ready for polling in such a manner, the polling transmission will be carried out to a mobile station on which the polling flag is set (S50). The procedure then returns to S11 shown in FIG. 7.

A base station having no mobile station to be subjected to the polling transmits dummy polling. The frame of such dummy polling is similar to those of FIGS. 4A–4D except that the indication channel number, mobile station number and data are dummy. The data may be fixed to a length sufficient for the mobile station to perform the carrier sense or may be the maximum length among those of the base stations in one polling cycle.

Figure 11:
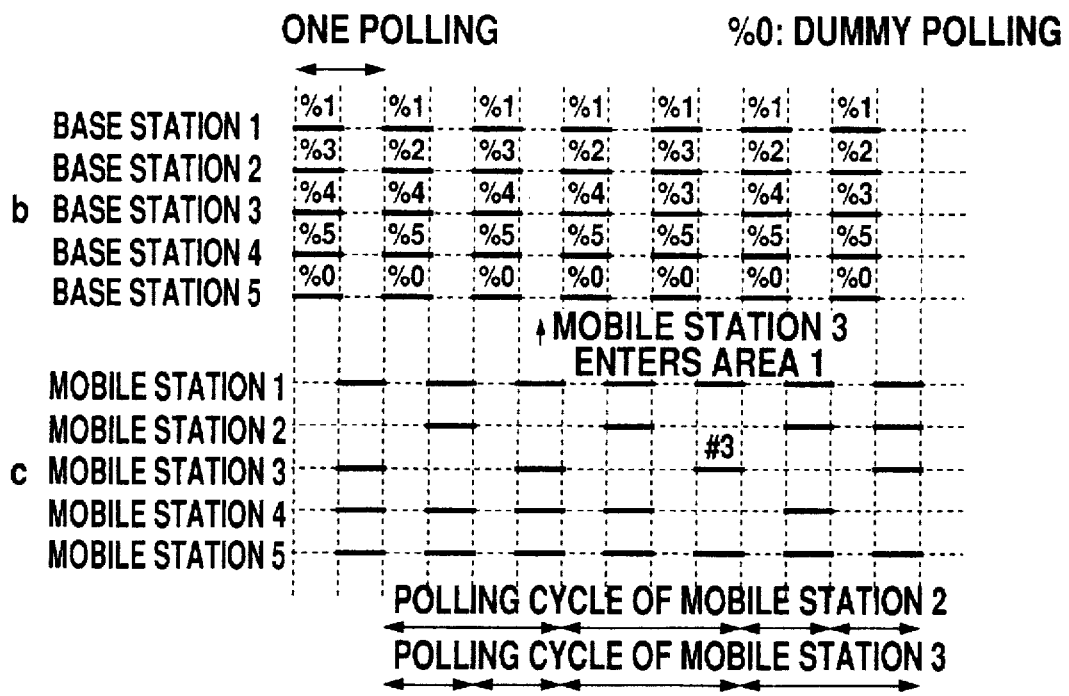
FIG. 11 is a timing chart illustrating the operation in the first embodiment.

FIG. 11 shows a timing chart for control in the present embodiment. As will be apparent from the polling registry table, the first polling operation is made such that the receiving base station number #1 corresponds to the mobile station %1; the receiving base station number #2 to the mobile station %3; the receiving base station number #3 to the mobile station %4; the receiving base station number #4 to the mobile station %5; and the receiving base station number #5 to no mobile station. Thus, the polling will be carried out as shown in the polling indication table of FIG. 6C. The system receives the polling responses from each of the mobile stations %1, %3, %4 and %5. The polling flag in the mobile station %2 is then rewritten. Therefore, the second polling operation is made for the mobile stations %1, %2, %4 and %5. The third polling operation is performed for the mobile stations %1, %3, %4 and %5, as in the first polling operation. It is now assumed that the mobile station %3 enters the area 1 and that the base station controlling the mobile station %3 is changed from #2 to #3. In such a case, the shift from the base station #2 to the base station #3 is not still recognized in the fourth polling operation. The fourth polling operation is therefore carried out for the mobile stations %1, %2, %4 and %5 as in the second polling operation. At this time, however, the requested channel number has been changed to f3 (i.e., mobile station #3) in the polling response from the mobile station %3. The key station 10 recognizes this change and registers the mobile station %3 relative to the receiving base station #3 in the polling registry table. As a result, the fifth polling operation will be made for the mobile stations %1, %3, %3 and %5. In other words, the base station #2 will execute the current polling for the mobile station %3 since the immediately previous polling operation has been made for the mobile station %2. On the other hand, the base station #3 will perform the current polling operation for the mobile station %3 at the step S35. If the polling response is returned from the mobile station %3 back to the base station #3, the latter will be registered as a receiving base station number for the mobile station %3. At step S25, the mobile station %3 is then deleted relative to the receiving base station number #2. Thus, the sixth polling operation is carried out for the mobile stations %1, %2, %4 and %5 and the seventh polling operation is performed for the mobile stations %1, %2, %3 and %5. It will be finally registered that the base station controlling the mobile station %3 has been shifted from #2 to #3.

Since a requested channel number that is the identification data of a base station to be now used by a mobile station is sent to the key station according to the present embodiment, the position of that mobile station can be clearly grasped by the key station at all times, resulting in provision of good communication. The similar advantage can be obtained even by transmitting an area number from a mobile station to the key station which in turn determines a base station to communicate with that mobile station. After it has been confirmed that the mobile station is in connection with a base station to be next used, the registry of the mobile station relative to the previous receiving base station is deleted from the polling registry table. Consequently, the reliability in communication can be improved.

The system determines a requested base station by utilizing the carrier sense system and the area identification system utilizing the table of FIG. 5B while switching them from one to the other. It is possible for the carrier sense system to only receive radio waves (carriers) from the base stations without any special installation. Therefore, the carrier sense system is suitable for use in control over a broad range. On the other hand, the area identification system can simply determine a base station from the position of a mobile station. Even though the base stations are located close to one another, the assignment of areas to be controlled can be accurately determined. It is thus preferable that the area identification system is used in a case where the base stations are located close to one another in such an area that the mobile stations move concentrically. A preferred overall system can be provided by combining the carrier sense system with the area identification system.

According to the present invention, thus, the mobile stations do not require any special time period when a base station is shifted to another base station. Even if a communication error is created during such a shifting, the key station will not lose the position of any mobile station while no mobile station will lose any base station. Therefore, the reliability in communication can be improved.

Figure 12:
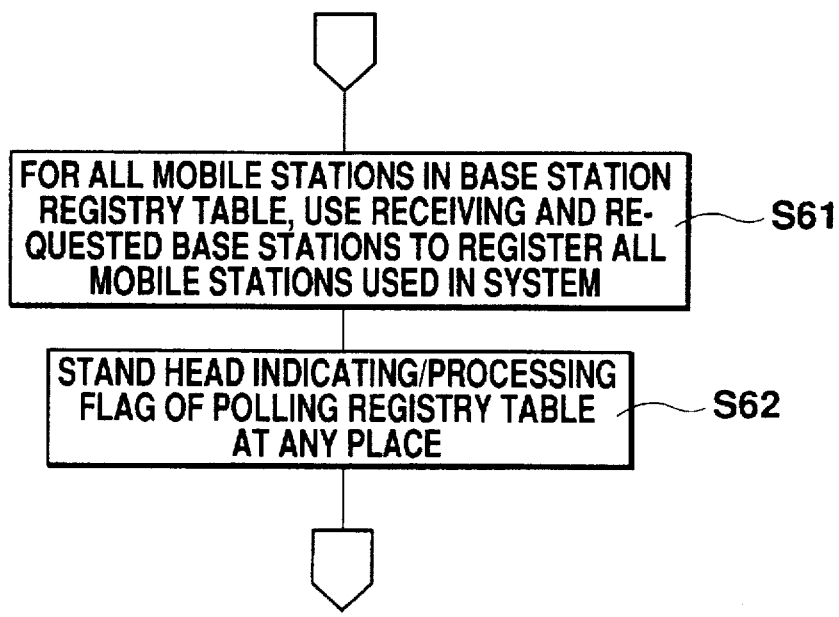
FIG. 12 is a flowchart illustrating the setup.
Figures 13, 14:
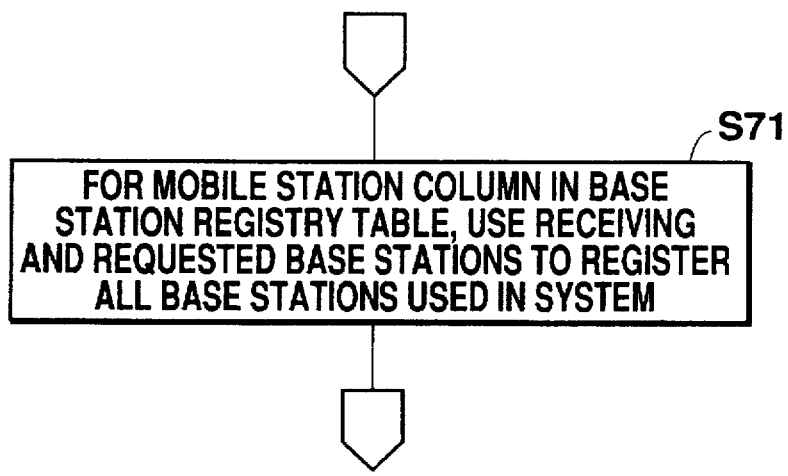
FIG. 13 is a view illustrating the registry table of base stations during setup.
FIG. 14 is a flowchart of a process when a mobile station leaves an area.

FIG. 12 shows a flowchart illustrating the setup process. During the setup, all the base stations used by the system are registered relative to all the mobile station columns in the base station registry table, using the columns of receiving and requested base stations in the same table (S61). An indicating/processing flag in the polling registry table is set at any place (S62). It is preferred that the position of the head indicating/processing flag has previously be set since it can be set at any suitable place. With such a process, all the base stations are registered for each of the mobile stations, as shown in FIG. 13. More particularly, for all the mobile stations, the base station #1 is registered as a receiving base station number and the base stations #2, #3, #4 and #5 are registered as requested base station numbers. Thus, the first polling operation may be carried out from all the selected base stations to the mobile station #1. If the mobile station #1 returns the response to any one of the base stations, the number of that base station will be registered as a receiving base station number. If the requested base station number is invariable at this time, the number of that base station will also be registered for the requested base station number. In such a manner, the receiving base stations can be registered for all the mobile stations during the setup of the system.

The area separation will be described with reference to FIG. 14. At the aforementioned step S17, if there is still no response, and when there is a mobile station whose set time period has elapsed, all the base stations used by the system are registered relative to the column of that base station in the base station registry table, using the columns of receiving and requested base stations (S71). For that base station, thus, all the base stations become receiving or requested base stations. As a result, that mobile station will be registered relative to all the base stations in the polling registry table. The polling can be carried out from all the base stations to that mobile station. If that mobile station returns back into the area, any one of the base stations can receive the polling response.

[Process in Mobile Station]

Figure 15:
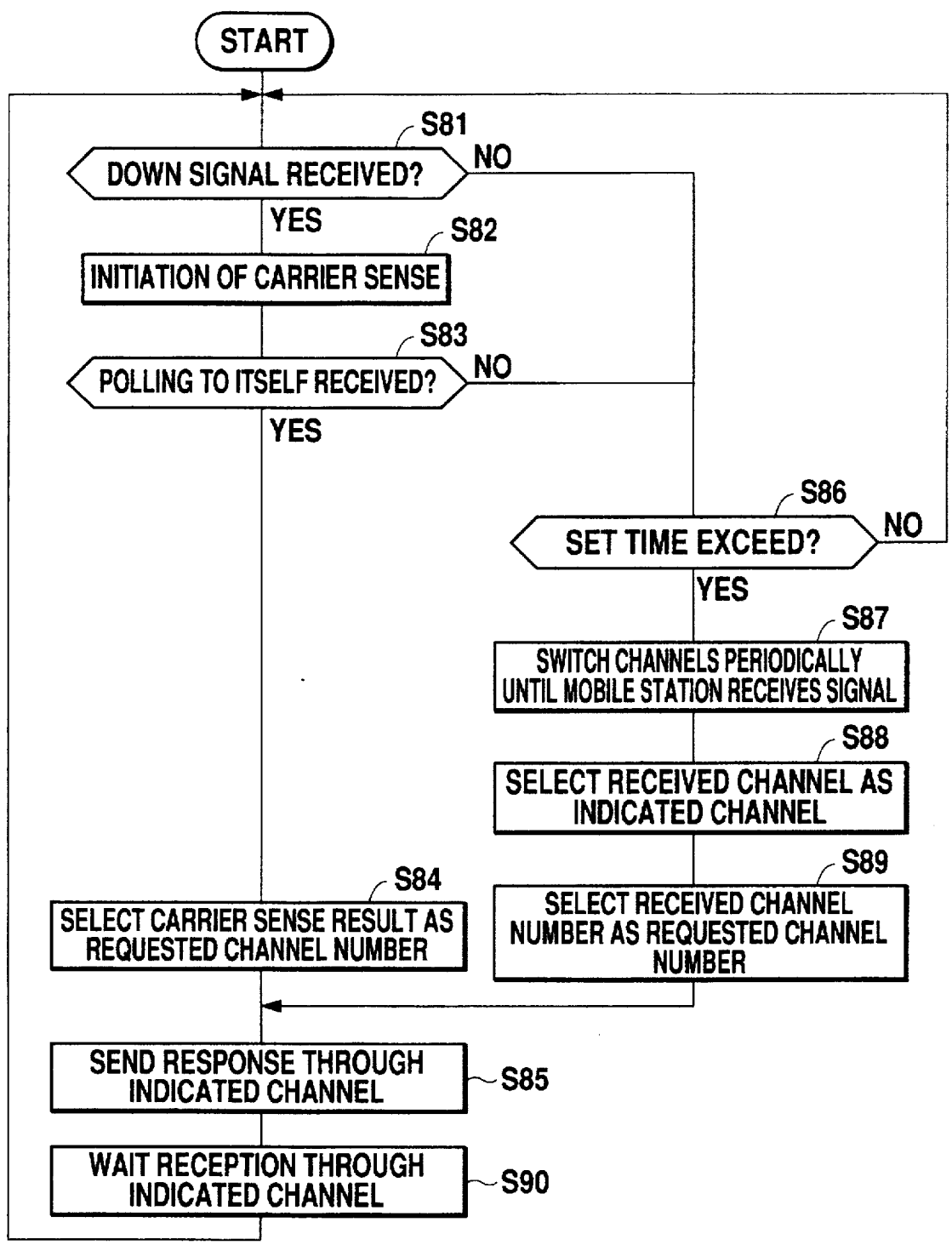
FIG. 15 is a flowchart of the control of a mobile station.

A flowchart for controlling the mobile stations will be described with reference to FIG. 15. A mobile station first judges whether or not it receives a down signal (S81). If so, the carrier sense is initiated (S82). At the same time, it is judged whether or not the polling toward the mobile station itself is received (S83). If so, a requested channel number becomes the result of the carrier sense (S84) and the response is transmitted through an indicated channel (S85).

On the other hand, if the down signal is not received by the mobile station at step S81 and when the mobile station does not receive the polling toward itself at step S83, it is judged whether or not the set time period has elapsed (S86). If not, the procedure returns to step S81. If the set time period has elapsed, the channels are switched from one to another with a given cycle until the mobile station receives all the above signals (S87). If a channel can receive these signals, that channel is selected as an indicated channel (S88). This channel is also selected as a requested channel number (S89). The procedure then proceeds to S85 where the mobile station transmits the response through the indication channel and awaits a signal through the indicated channel (S90). In the normal case, thus, the requested channel number is changed to another one from the result of the carrier sense and matched to the change of the base station to be controlled. If the mobile station can not receive the polling toward itself, the channel is changed from one to another to deal with such a situation.

[Others]

If the down data is identified by interpreting the received data of carrier sense frequency when the mobile station performs the carrier sense, each of the base stations can perform the polling at independent timing. In such a case, it is preferred that the broadcast polling is carried out only when a single mobile station is subjected to polling from a plurality of base stations during switchover of the base stations. If it is permitted during the changeover to carry out the polling, the changeover of channels in the mobile stations may be carried out after the transmission. Thus, independent polling can be performed during the changeover.

Although the aforementioned embodiment is characterized by the up and down frequencies of the same level, they may be offset from each other by a given frequency. Furthermore, CDM (Code Division Multiplex) using spread spectrum communication can be used.

Second Embodiment

The second embodiment will now be described. However, the description of matters similar to those of the first embodiment will be omitted.

[System Layout]

Figure 16:
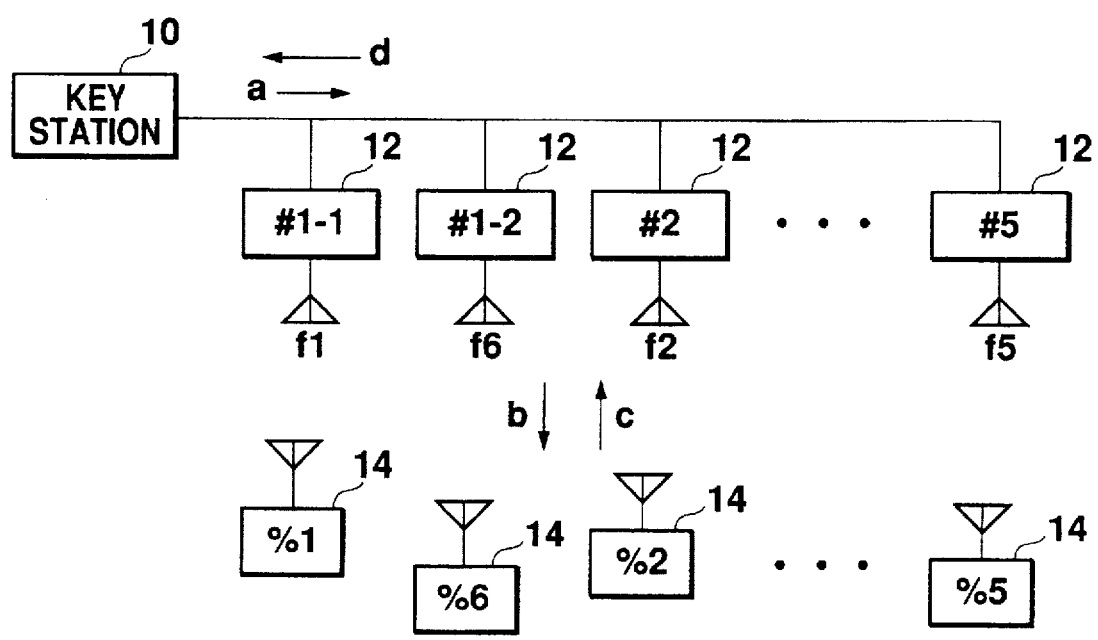
FIG. 16 is a view showing the layout of a second embodiment.

FIG. 16 shows the system layout of the second embodiment which is characterized by the broadcast communication.

A key station 10 is connected to a plurality of base stations 12, but the second embodiment is different from the first embodiment in that additional base stations #1-1 and #1-2 are provided. More particularly, the base stations are divided into groups. Among them, group 1 includes the base stations #1-1 and #1-2. The channel frequency of the base station #1-2 is f6. In this example, a mobile station %6 is now in communication with the base station 1-2. The first number representing the group of base station numbers will be called the "parent number" while the branch numbers of the base stations in the group will be called the "child number".

[Frame Structure of Signal]

The signal frame structures are similar to those of FIGS. 4A–4D. The "selected base station number" contained in the signal frame of a signal a from the key station 10 to the base stations 12 only consists of a parent number, but does not include any child number. Therefore, the data is the same as in the first embodiment.

[Setting Table]

FIG. 17A shows a channel setting table while FIG. 17B shows an area setting table. As will be apparent, the setting table is different from that of the first embodiment in that the base stations 12 are specified by parent and child numbers. More particularly, the channel frequencies of the base stations #1-1 and #1-2 are set to be f1 and f6, respectively. In this example, only the base stations #3 and #4 are respectively present in groups 3 and 4, in each of which the area is set. If a plurality of base stations 12 are present in one group, however, an area will be set for each of the base stations which is specified by a child number.

[Control Table]

FIGS. 18A, 18B and 18C show a base station registry table, a polling registry table and a polling indication table, respectively. In this example, the base station #1-2 is registered as receiving and requested base stations for the mobile station %6 in the base station registry table since the mobile station %6 is in communication with the base station #1-2. The receiving base station #1 in the polling registry table (wherein the base station #1 includes both the receiving base stations #1-1 and #1-2 to register only the parent number) performs the down communication to the mobile stations %1 and %6. Since the current down communication is carried out for the mobile station %1, the polling flag becomes "1" relative to the mobile station %1. On the next polling communication, the polling flag becomes "1" relative to the mobile station %6.

The selected base station 12 and mobile station 14 in the current polling are described in the polling indication table. Based on the polling indication table, a signal frame is prepared to perform polling communication.

In such a manner, only parent numbers are registered in the polling registry table. Further, only a parent number is indicated to the signal frame from the key station 10 to a base station 12 as a selected base station number. Thus, the down communication will be performed from both the base stations #1-1 and #1-2 to the mobile stations %1 and %6 both of which can receive the same data. As a result, the same data can be transmitted to all the mobile stations in one group. Since only the indicated mobile station 12 returns the polling response, the polling communication can be carried out to the respective one of the mobile stations 14 by sequentially changing the mobile station 14 to be subjected to the polling from one to another.

Although a plurality of groups are used in this example, the present invention is not limited to such an arrangement, but may be applied to a single group. With a single group, the broadcast transmission/independent polling will be carried out.

[Process in Key Station]

The process in the key station is basically similar to that of the first embodiment. However, the judgment at step S23 shown in FIG. 8 is to compare the parent numbers of the receiving base stations with one another. More particularly, at step S23, it is judged whether or not the parent number of a receiving base station to be processed coincides with that of the receiving base station in the base station registry table. This is because all the base stations having the same parent number perform the down communication.

Figure 10:
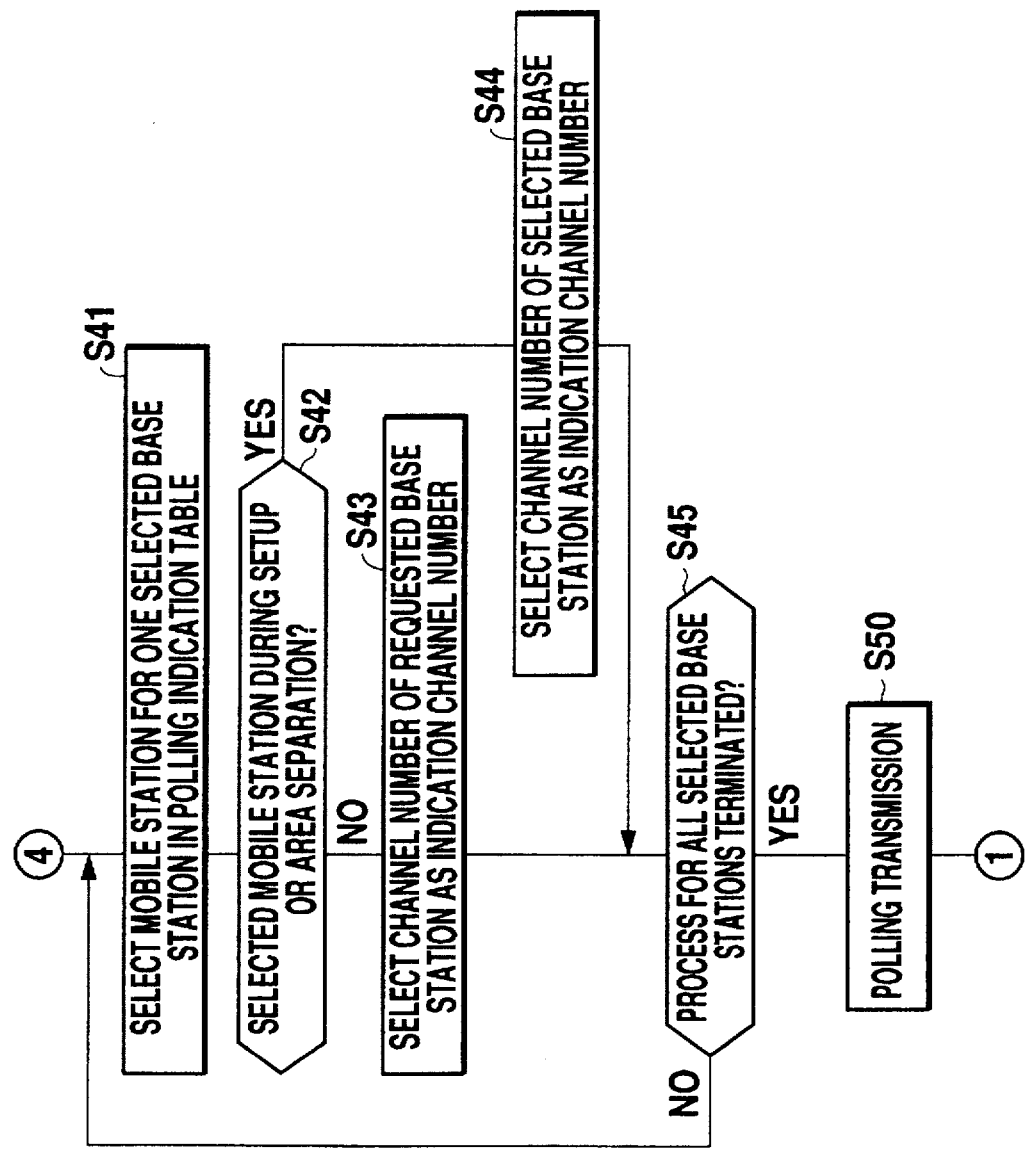

In the first embodiment, at step S44 of FIG. 10, the indication channel number is selected as the channel number of a selected base station during the setup of the mobile station or during the area separation. If the selected base station (parent number) has a plurality of channels, however, the first embodiment cannot specify one channel. In such a case, therefore, the indication channel number is determined to be a dummy channel.

[Process in Mobile Station]

Figure 19:
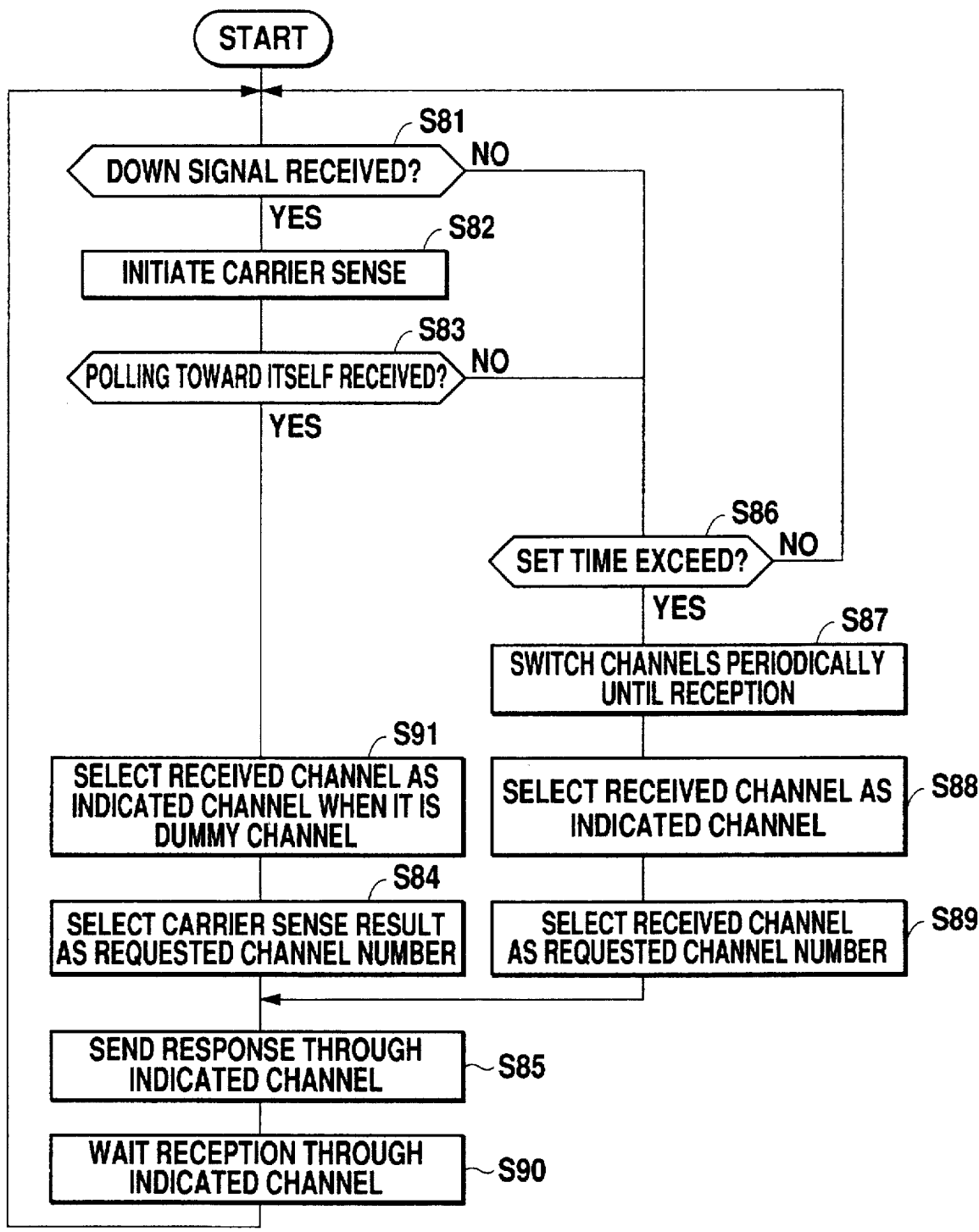
FIG. 19 is a flowchart showing the control of a mobile station.

The process in the mobile station is also basically similar to that of the first embodiment except that the second embodiment includes an additional step (S91) between the steps S83 and S84, this additional step S91 being adapted to determine a received channel at an indication channel when the indication channel is a dummy channel, as shown in FIG. 19. During the setup of the mobile station 14 or during the separation, the mobile station can return the polling response to determine that channel as an indication channel when it receives the down communication. This makes the start or restart of the communication smooth.

[Polling Communication Procedure]

Figure 20:
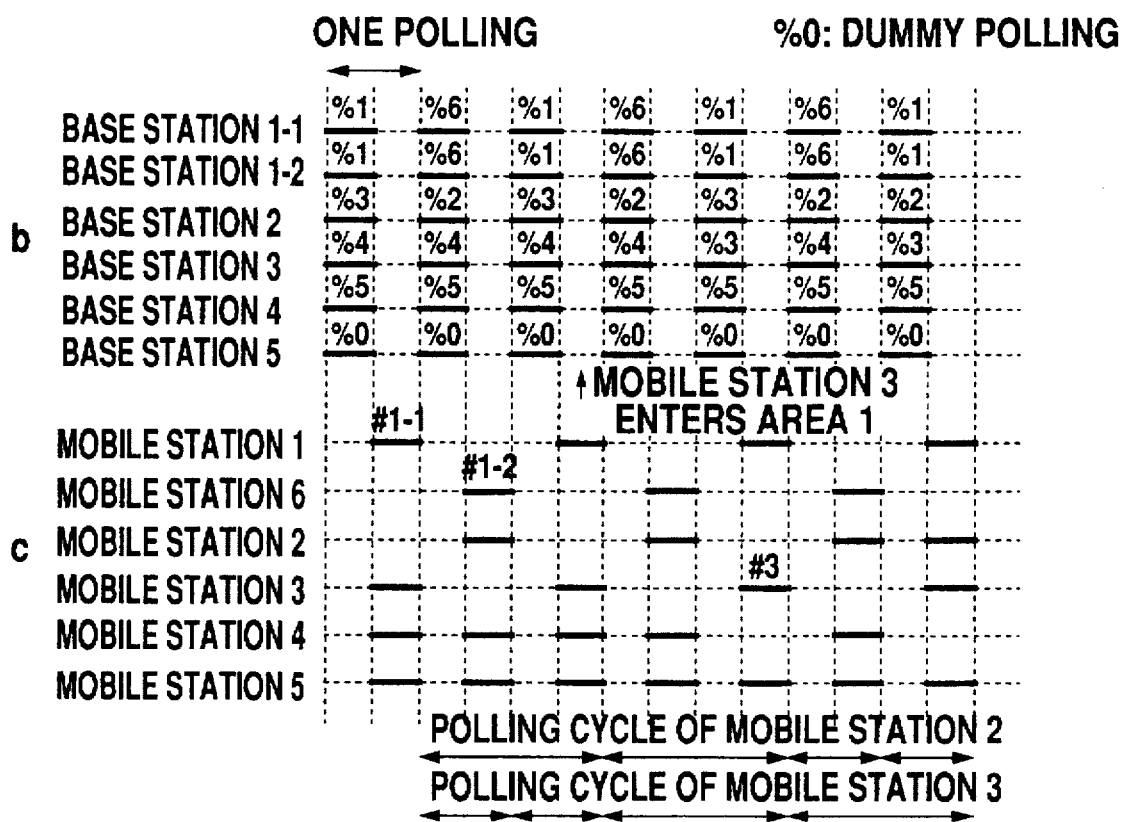
FIG. 20 is a timing chart illustrating the operation in the second embodiment.

FIG. 20 shows a timing chart of the communication between the base stations 12 and the mobile stations 14. As will be apparent from this timing chart, the base stations #1-1 and #1-2 perform the down communication in the polling down communication through the base station #1. The destination will be alternately selected from the mobile stations %1 and %6. If a plurality of mobile stations are present in a group (the same parent number), these mobile stations is sequentially selected as a destination. However, all the mobile stations receive the down communication.

On the other hand, the mobile stations return the polling response only when the destination of the down communication is themselves. Therefore, the mobile stations %1 and %6 will alternately return the polling response. If a number of mobile stations 14 are present in the same group (the same parent number), the down communication is received by all the mobile stations 14 which will sequentially return the polling response one at a time.

Figure 21:
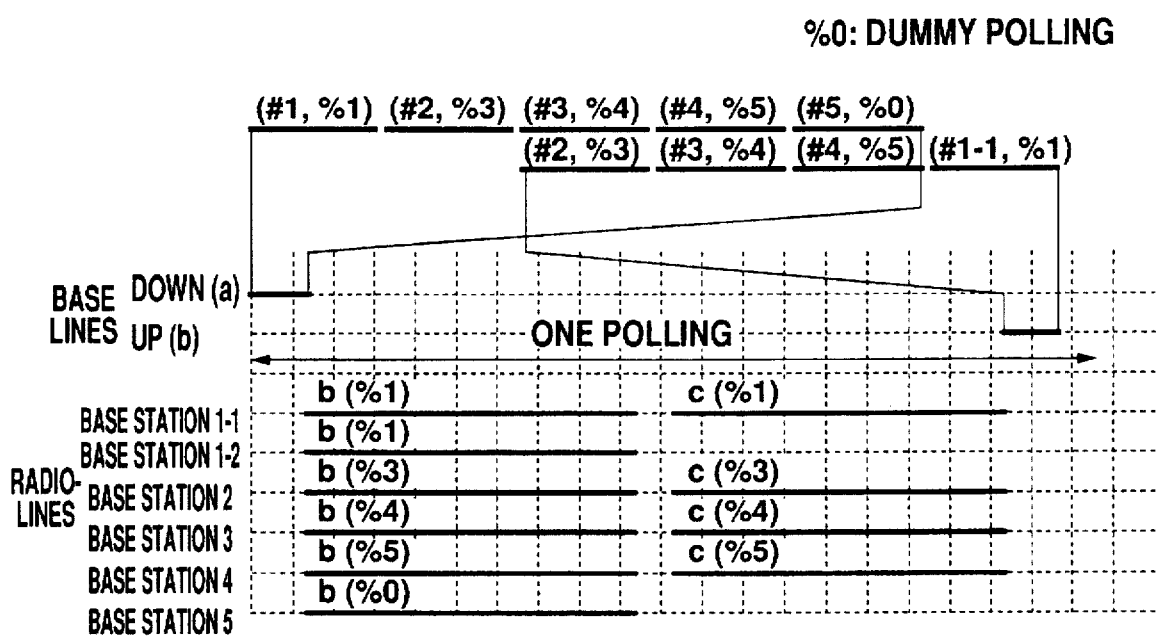
FIG. 21 is a timing chart illustrating the timing of signals on the base station lines in the second embodiment.

FIG. 21 is a timing chart illustrating the data transfer on lines. First of all, the down communication a from the key station 10 to each of the base stations 12 is carried out through base lines. Each of the base stations 12 executes the down communication b to the corresponding mobile station 14 through radio-lines. Both the base stations #1-1 and #1-2 perform the down communication b relative to the mobile station %1. Thus, the other mobile station %6 can also receive the communication to the mobile station %1.

Each of the base stations 14 returns the polling response (signal c) to the corresponding base station 12 which in turn returns the up communication to the key station 10.

In such a manner, the broadcast polling communication can be carried out which simultaneously sends a signal to all the mobile stations 14 in the same group and independently receives the polling response from the respective mobile stations 14.

If it is desired to utilize the mobile communication for controlling unmanned vehicles such as unmanned carrier cars, the data sequentially transmitted from the ground to each of the vehicles may contain a security signal area. Each of the vehicles monitors such a signal at all times. In the event of an accident, the vehicles may be simultaneously stopped to prevent impingement. According to the second embodiment, the broadcast polling can be executed to send the data from all the base stations to each of the mobile stations which can receive the data sent to all of the mobile stations. Therefore, all the mobile stations in one group can monitor the security signal in the data at all times. In the event of an accident, all the mobile stations can be simultaneously stopped to prevent impingement.

In this polling communication, a base station to be connected with a mobile station 14 is specified by the positional information of that mobile station or from the result of the carrier sense, as in the first embodiment. Thus, the switch of the base stations to be controlled from one to another can be smoothly executed.

Figures 22, 23:
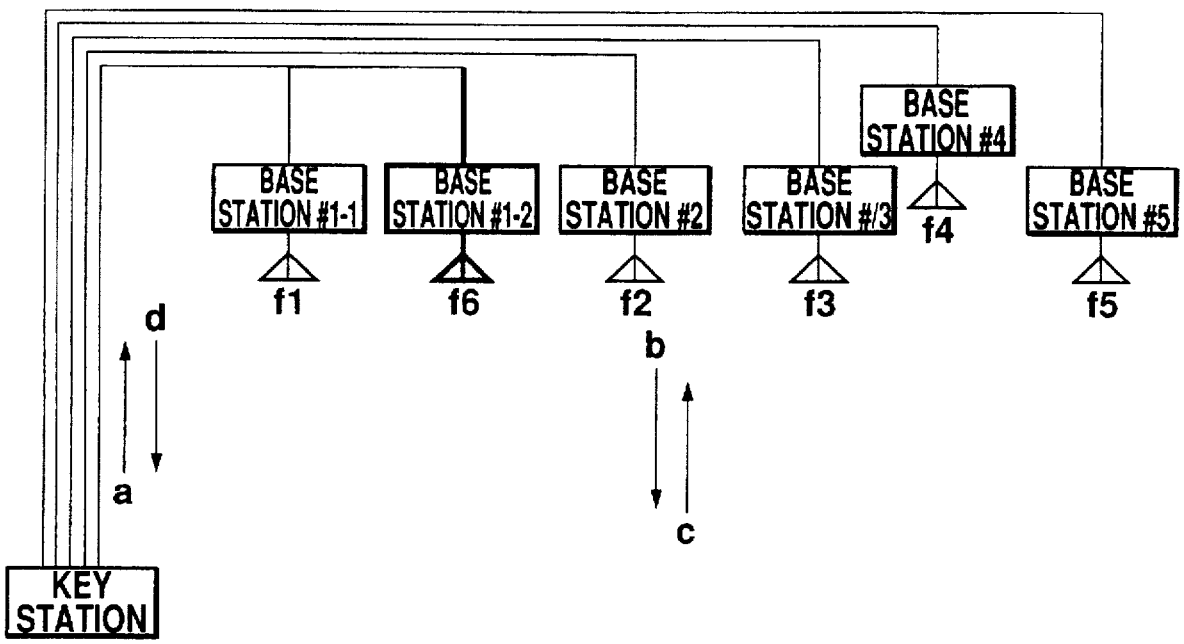
FIG. 22 is a view illustrating a layout wherein the base station lines are connected together in a star-like configuration in the second embodiment.
FIG. 23 is a timing chart illustrating the timing in the layout of FIG. 22.

FIG. 22 shows a modification of the second embodiment wherein star-like base line layouts between the key station 10 and the base stations 12 are connected with one another through individual communication lines. In such an arrangement, the parallel communication can be accomplished between the key station 10 and the mobile stations 14 through the base stations 12. This can reduce time required by one polling operation.

Third Embodiment

In the third embodiment, similarly, the description of the same matters as in the first embodiment will be omitted.
[System Layout]

Figure 24:
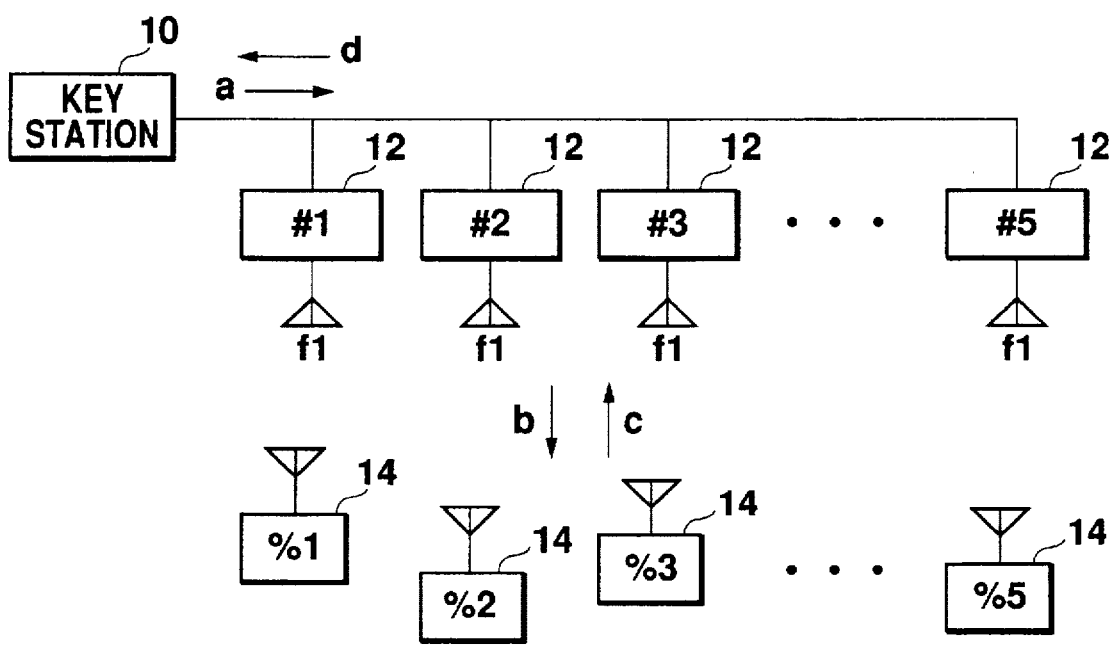
FIG. 24 is a view of the layout of the third embodiment.

The layout of the third embodiment is shown in FIG. 24. As will be apparent from this figure, the overall system layout is similar to those of the first and second embodiments except that all the base stations 12 in the third embodiment communicate with the mobile stations 14 through the same channel (the same frequency). More particularly, all the base stations #1–#5 execute the radio communication with the base stations using a frequency f1.

The base stations 12 sequentially send a signal. Each of the mobile stations includes a transmitter-receiver unit 14B having a carrier sense function that compares the intensities of radio waves from the respective base stations 12 with one another to determine a base station to be selected (requested base station).
[Signal Frame Structure]

FIG. 25A shows the frame structure of a signal a from the key station 10 to the base stations 12, which is the same as in the first embodiment. The frame structure of a signal b from a selected base station 12 to the mobile stations 14 includes an additional selected base station number as shown in FIG. 25B. This is because all the base stations use only one channel number in the third embodiment and the mobile stations require the "selected base station number" to recognize a base station 12 that has sent a signal.

A signal c that is the polling response returned from the mobile station 14 to the base station 12 contains a "sending base station number" as shown in FIG. 25C. The sending base station number can be used to cause a base station 12 that has received a signal to recognize that that signal is directed toward itself. In the third embodiment, a "requested channel number" is taken in place of the "requested base station number" that is determined by the mobile station 14 returning the polling response from the result of the carrier sense.

As shown in FIG. 25D, a signal d sent from the base stations 12 to the key station does not include the "receiving base station number". The receiving base station number is not required by the third embodiment because the communication is performed sequentially from the key station 10 to the respective mobile stations 14 through the selected base stations 12.
[Setting Table]

The setting table of the third embodiment does not have the channel setting table. This is because all the base stations use the same channel (frequency f1). The area setting table is of the same structure as in the previous embodiments. Depending on the position of the mobile station, therefore, the area setting table can be utilized to determine a base station to be used next.
[Control Table]

The control table comprises a base station registry table (FIG. 26A), a polling registry table (FIG. 26B) and a polling indication table (FIG. 26C), as in the previous embodiments.

Requested base stations for each of the mobile stations have been registered in the base station registry table. Since the polling communication is performed for each base station, it is not required that receiving base station numbers are registered in addition to the requested base station numbers. In the polling registry table, the head indicating/ processing flag of a requested base station to be subjected to the polling next is set to "1". In this embodiment, the base station #3 is next to be subjected to the polling. In the polling of the base station #2, the mobile station %2 is first subjected to the polling.

The polling indication table describes base and mobile stations that are determined on the polling registry table and to be placed next in the polling communication. In this example, the base station #3 and mobile station %4 are described since the polling is to be made therebetween.
[Process in Key Station]

The process in the key station 10 is basically similar to that of the first embodiment and will be described only in connection with some different respects.

Figure 27:
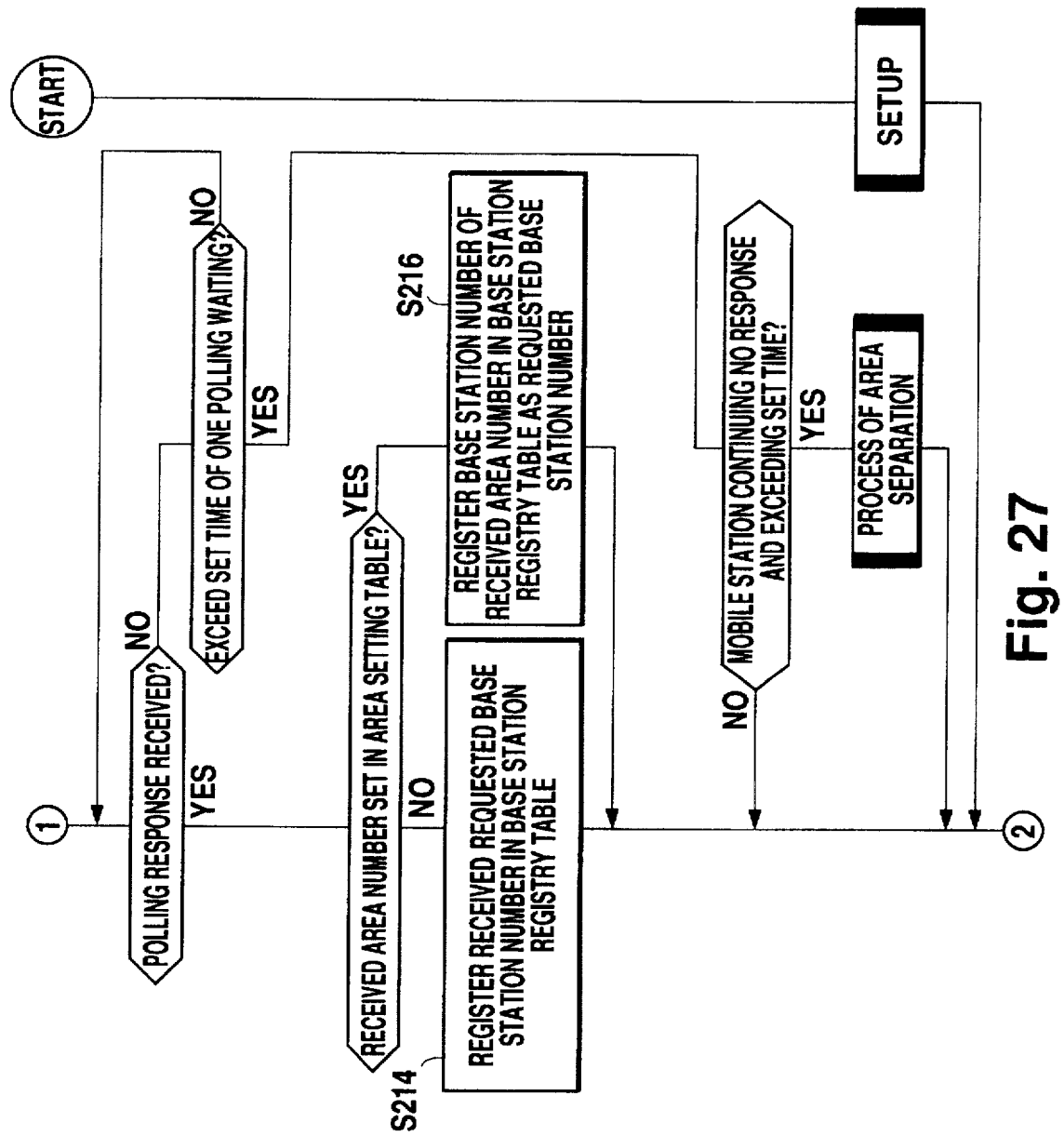
FIGS. 27-29 are flowcharts illustrating the processing in the key station.

FIG. 27 shows no registry of receiving base station that corresponds to the step S13 of FIG. 7. In the registry of requested base station number at the step S216, it is registered in the base station registry table independently of which column the requested base station number should be registered at, since there is no receiving base station number. Since only one mobile station is to be subjected to one polling operation, there is no judgment of whether or not the procedure relating to a plurality of mobile stations (which corresponds to the step S17 in FIG. 7) has completed.

Figure 28:
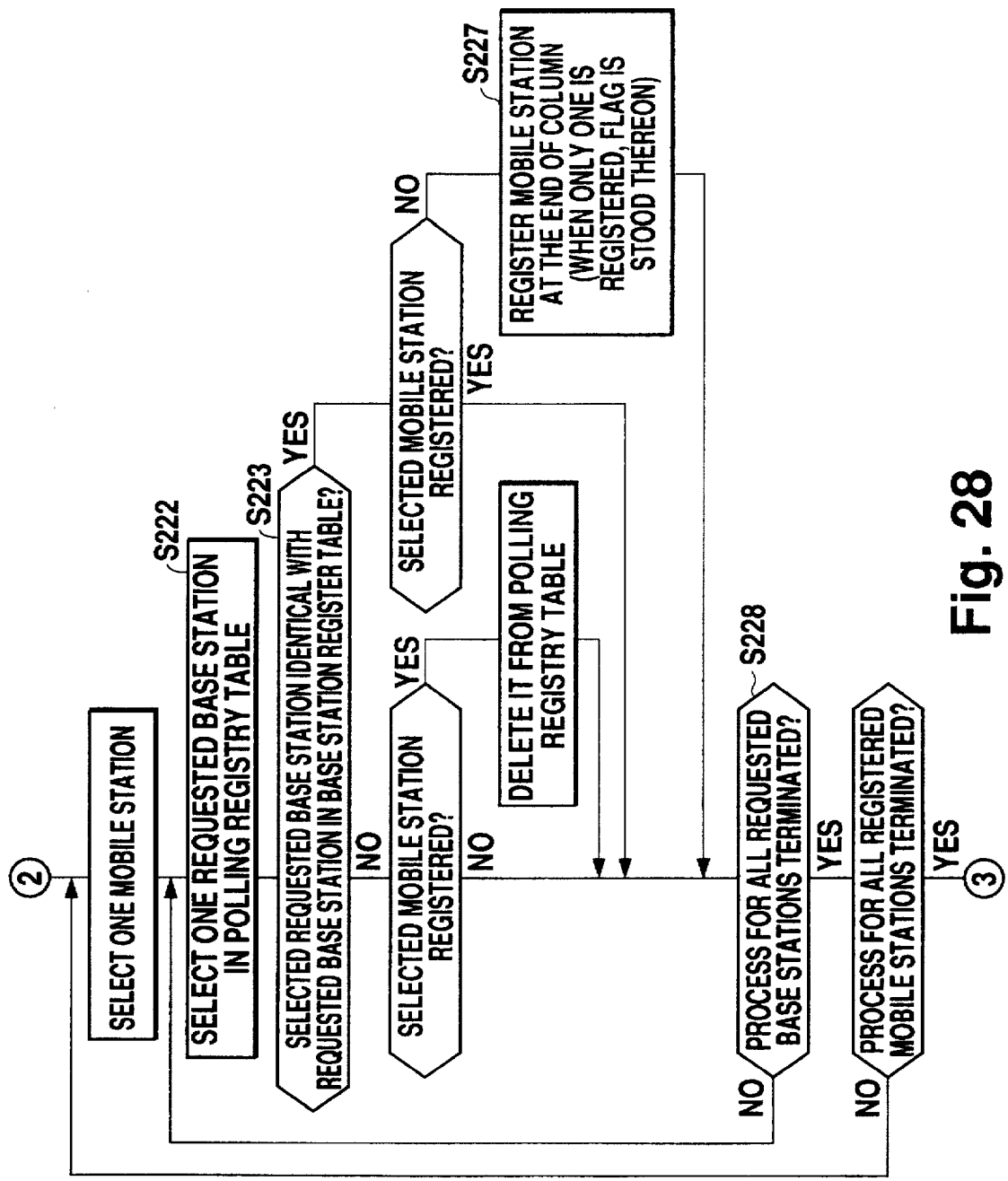
Figure 29:
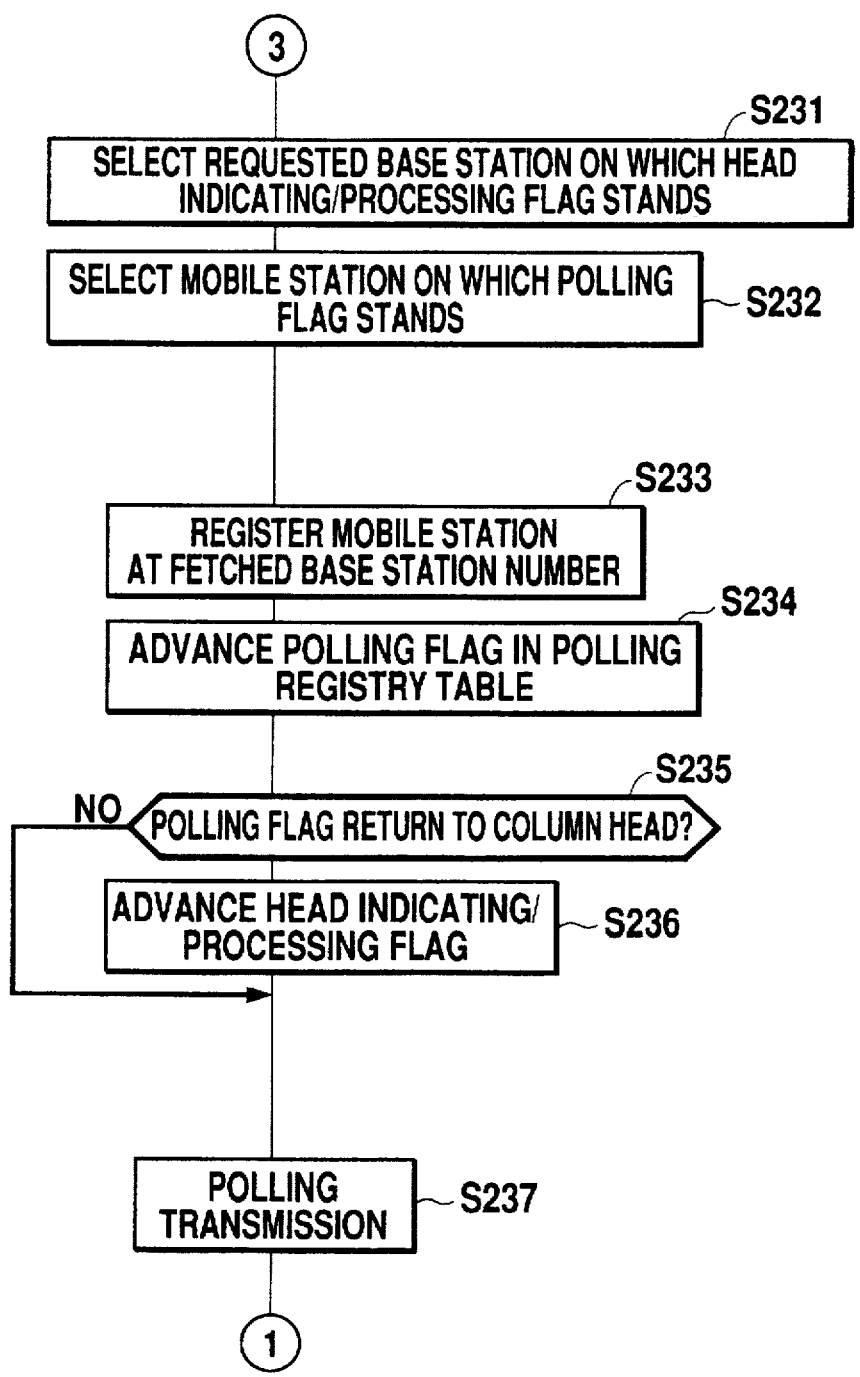

In the procedure of FIG. 28, the process of receiving base station number is replaced by the process of requested base station number since only the requested base station numbers are present in the base station registry table.

More particularly, a requested base station to be processed is selected at step S222 and it is judged at step S232 whether or not the selected requested base station is identical with the requested base station in the base station registry table. During the area separation or during the setup, the base station registry table includes a plurality of requested base stations since all the base stations are registered therein as requested base stations. At step S227, a selected mobile station is registered on the end of the requested base station column in the polling registry table. More particularly, since a mobile station has not been registered in the polling registry table despite the fact that the requested base station to be processed is identical with the requested base station in the base station registry table, that base station is registered at step S227. At step S228, it is judged whether or not the process of all the requested base stations has terminated.

Since in this example only one mobile station is subjected to the polling in one communication, the procedure from the start to the polling communication (which corresponds to the procedure of FIGS. 9 and 10) is greatly simplified.

A requested base station to be processed, in which the head indicating/processing flag of the polling registry table is set, is selected (S231), and at the same, time a mobile station in which the polling flag is set is selected (S232). The selected mobile station is registered in the polling indication table at the number of the fetched base station (S233) while the polling flag of the polling registry table is advanced to the next mobile station (S234). It is then judged whether or not the polling flag returns to the start of the column of the base stations to be processed (S235). If so, the head indicating/processing flag is advanced to the further next mobile station to change the requested base station to be processed (S236).

When the procedure of the polling registry table and polling indication table has terminated, the polling communication is initiated according to the contents of the polling indication table (S237). In such a manner, a single selected base station number and associated mobile station numbers are described in the polling indication table. The polling is executed according to the polling indication table.

[Setup]

Figures 30, 31:
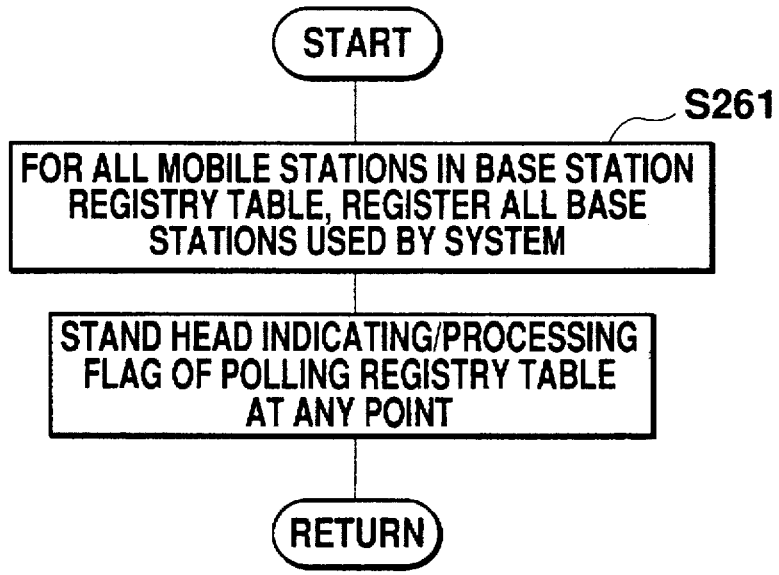
FIG. 30 is a flowchart illustrating the setup.
FIG. 31 is a view illustrating the registry table of base stations on the setup.

During the setup, all the base stations used in the system are first registered in the base station registry table at the requested base station column for all the mobile stations (S261), as shown in FIG. 30. All the base stations are thus registered in the base station registry table as requested base stations for the respective mobile stations, as shown in FIG. 31. Next, the head indicating/processing flag of the polling registry table is set on any place. In other words, the head indicating/processing flag of any base station is set to "1" since the process may be initiated at any base station.

Thus, the polling is sequentially carried out from each of the base stations to the respective mobile stations. The requested base stations for the respective mobile station are sequentially determined.

[Area Separation]

During the area separation, all the base stations used by the system in connection with a separating mobile station are registered in the base station registry table. Therefore, the polling is performed from each of the base stations to that mobile station. When the mobile station returns to the original area, the requested base stations are determined.

[Process of Mobile Station]

Figure 32:
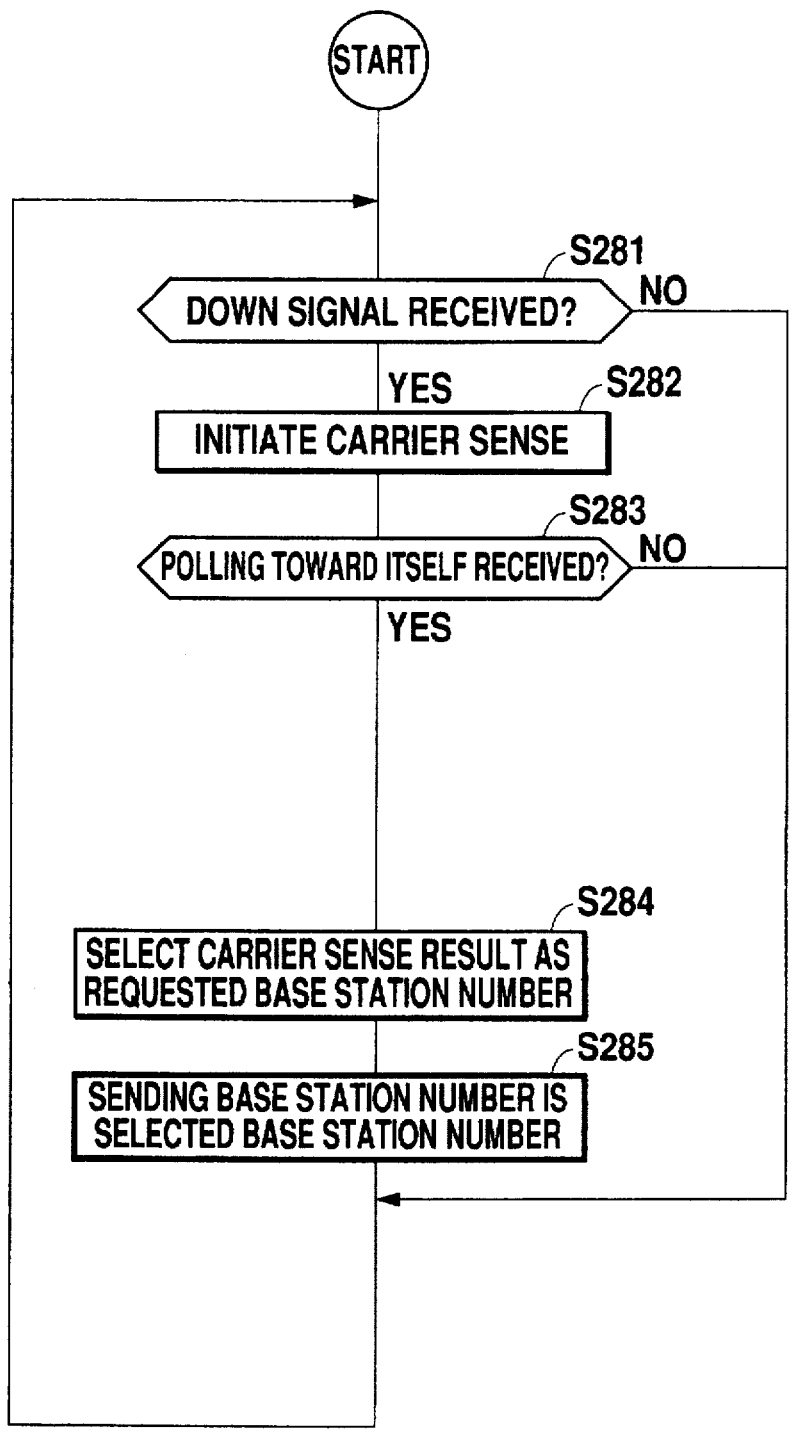
FIG. 32 is a flowchart of the control of mobile stations.

A flowchart of the procedure in the mobile station is shown in FIG. 32. It is first judged whether or not the mobile station receives the down signal (S281). If so, the carrier sense is initiated (S282). It is then judged whether or not the mobile station receives the polling toward itself (S283). If so, a requested base station number is set to be the result of the carrier sense (S284) and at the same time the number of the sending base station is set to be a selected base station number (S285). As a result of the carrier sense when the down signal is received, the optimum base station (which has the largest intensity of received radio wave) can be found and used as a requested base station which is in turn transmitted to the key station. The sending base station number can be used as the selected base station number to return the polling response to the sending base station.

At this stage, the key station is responsive to the sending requested base station for changing the base station to be used in the polling from one to another in connection with the base station in question. Therefore, a base station to be used can be determined from the result of the carrier sense in the mobile station. If an area number has been set, a base station to be used is determined depending on the positional signal (area number) sent from the mobile station.

[Timing in Polling Communication]

Figure 33:
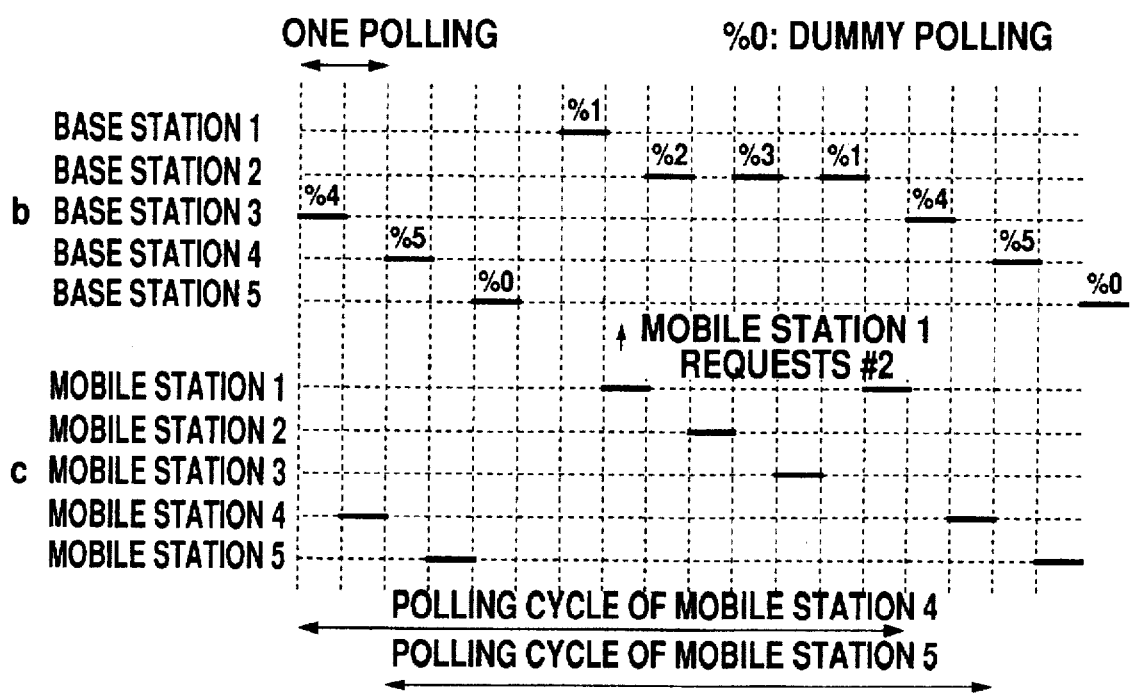
FIG. 33 is a timing chart illustrating the operation in the first embodiment.

FIG. 33 shows a timing chart in this embodiment. The polling communication is sequentially carried out for the base stations. If a plurality of mobile stations are registered for one base station, all the mobile stations are subjected to the polling communication. When the polling communication has terminated for all the mobile stations, the polling communication is further performed through the next base station. In this example, the mobile stations %2 and %3 have originally been registered for the base station #2. Since the mobile station %1 specifies the base station #2 as a requested base station in the polling response to the mobile station %1, the polling to the mobile station %1 is also carried out when the polling is made to the base station #2.

A base station having no registered base station (in this example, the base station #5) sets a mobile station to be processed as a mobile station %0 and performs a dummy communication. Such a dummy communication permits the mobile station to execute the carrier sense. A mobile station entering the area controlled by the base station #5 sets this base station as a requested base station depending on the result of the carrier sense. Thus, the base stations can be switched from one to another.

[Other Structures]

Although the third embodiment has been described as to a single frequency, the present invention may be applied to up and down frequencies which are different from each other. Since the mobile stations controlled by one base station can receive any signal transmitted toward the other mobile station in the same base station, broadcast communication can be executed within this range.

[Advantages of This Embodiment]

According to this embodiment, a plurality of base stations may be provided such that even if the communication area is enlarged, the number of channels will not be increased and the frequency band can be reduced. Since the carrier sense is not required by the base stations, the process on the side of base station can be relatively simple.

Since a base station is selected by a mobile station as in the previous embodiments, the optimum base station can be selected by a relatively simple structure.

I claim:

1. A mobile radio communication system configured to perform a polling operation, comprising:

a key station that communicates with a plurality of mobile stations through a plurality of base stations, wherein one of said mobile stations sends to the key station identification information of a base station to be used next in said polling operation, the key station then switching a polling path so as to include said base station to be used next when communicating with said mobile station as identified by said identification information, said mobile station switching the polling path such that a polling response will be returned therefrom to the key station through said base station to be used next, said mobile station being configured to send to said key station in the polling response said identification information of the base station to be used next, and said key station determining the polling path in accordance with the identification information and adding said base station to be used next to said polling path if said base station to be used next is not in currently in said polling path.

2. A mobile radio communication system according to claim 1 wherein the key station compares the base station to be used next indicated by the identification information from said mobile station and a base station which received the polling response from said mobile station, and said key station will carry out the polling to said mobile station through both base stations until the base station to be used next matches a base station which received the polling response of said mobile station.

3. A mobile radio communication system according to claim 1 wherein the key station sends the identification information of a base station switched on the basis of the identification information of the base station to be used next to said mobile station which sent said identification information, thereby indicating which base station should be used by said mobile station.

4. A mobile radio communication system according to claim 1, comprising a previously stored table containing the correspondent relationship between a position of a mobile station and a base station which should be used, and when the mobile station sends information of the position, the key station refers to the table and determines which base station should be used by said mobile station.

5. A mobile radio communication system according to claim 1 wherein the communication is carried out while switching between a carrier sense system in which a base station to be used next is identified by a mobile station on the basis of the state of carrier reception from a plurality of the base stations, the identity of the identified base station being then informed to the key station, and an area assignment system in which a mobile station sends information of its position and the key station determines a base station to be used next in accordance with the sent position of said mobile station.

6. A mobile radio communication system according to claim 5 wherein at a preselected location, a mobile station senses its own position from a position sensing marker on a path of mobile station travel, and said mobile station sends its position when said position sensing is carried out, while it sends the state of the carrier reception when said position sensing could not be carried out.

7. A mobile radio communication system according to claim 1 wherein the key station includes a base station registry table representing the correspondent relationship between a mobile station and a receiving base station and wherein when the key station receives the polling response from a mobile station, the receiving base station is renewed to the base station which received the communication from the mobile station.

8. A mobile radio communication system according to claim 7 wherein said base station registry table also describes the correspondent relationship between a mobile station and a requested base station to be used next by said mobile station and wherein when the identification information of a base station to be used next is sent from a mobile station to the key station, the base station registry table registers a base station specified by said identification information as the requested base station.

9. A mobile radio communication system according to claim 8 wherein the key station compares the receiving and requested base stations in the base station registry table and wherein if these base stations match each other, the key station uses said base station to carry out the polling to said mobile station and if not, the key station uses both the base stations to carry out the polling to said mobile station.

10. A mobile radio communication system according to claim 9 wherein during the setup of said system, the same base station is registered for all the mobile stations in said base station registry table as a receiving base station.

11. A mobile radio communication system according to claim 10 wherein during the setup of said system, a base station different from the receiving base station is registered for all the requested base stations in said base station registry table.

12. A mobile radio communication system according to claim 11 wherein said base station registry table can register a plurality of requested base stations for one mobile station and wherein all the receiving and requested base stations for one mobile station are set to be different from one another.

13. A mobile radio communication system according to claim 9 wherein said base station registry table can register a plurality of requested base stations for one mobile station and wherein when it becomes impossible for a mobile station to communicate, said base station registry table sets all the receiving and requested base stations for said mobile station to be different from one another.

14. A mobile radio communication system according to claim 1 wherein the signal from the key station is received by a plurality of mobile stations through a plurality of base stations.

15. A mobile radio communication system according to claim 14 wherein said plurality of base stations send the same signal designating a mobile station toward a plurality of the mobile stations and wherein only the designated mobile station returns the polling response to said base stations.

16. A mobile radio communication system according to claim 1 wherein all the base stations have the same signal frequency and in which one communication is carried out between one base station and one mobile station.

17. A mobile radio communication system according to claim 16 wherein the key station includes a table of mobile stations to communicate with all the base stations and wherein the key station performs the sequential communication with all the mobile stations through the base stations according to said table.

18. A mobile radio communication system according to claim 17 wherein a base station having no mobile station to communicate therewith sends a signal that does not specify any mobile station to be designated in the communication.

19. A mobile radio communication system according to claim 18 wherein each of said mobile stations has a carrier sense function of sensing and comparing the levels of received signals from said plurality of base stations and wherein said mobile station can specify a base station having the highest level of received signal as a base station to communicate with itself.

* * * * *